US012587756B2

(12) United States Patent
Tanaka et al.

(10) Patent No.: US 12,587,756 B2
(45) Date of Patent: Mar. 24, 2026

(54) IMAGING DEVICE AND ELECTRONIC APPARATUS

(71) Applicant: Sony Semiconductor Solutions Corporation, Kanagawa (JP)

(72) Inventors: Hideki Tanaka, Kanagawa (JP); Hidetoshi Katayama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 441 days.

(21) Appl. No.: 18/029,181

(22) PCT Filed: Oct. 11, 2021

(86) PCT No.: PCT/JP2021/037504
§ 371 (c)(1),
(2) Date: Mar. 29, 2023

(87) PCT Pub. No.: WO2022/091755
PCT Pub. Date: May 5, 2022

(65) Prior Publication Data
US 2023/0370736 A1     Nov. 16, 2023

(30) Foreign Application Priority Data

Oct. 27, 2020    (JP) ................................. 2020-179598

(51) Int. Cl.
*H04N 25/589*          (2023.01)
*H04N 25/617*          (2023.01)
(Continued)

(52) U.S. Cl.
CPC ......... *H04N 25/589* (2023.01); *H04N 25/617* (2023.01); *H04N 25/709* (2023.01); *H04N 25/7795* (2023.01)

(58) Field of Classification Search
CPC .. H04N 25/589; H04N 25/617; H04N 25/709; H04N 25/7795; H04N 25/61;
(Continued)

(56) References Cited

U.S. PATENT DOCUMENTS

| | | | | |
|---|---|---|---|---|
| 2009/0207291 A1* | 8/2009 | Abe | ...................... | H10F 39/802 |
| | | | | 348/308 |
| 2010/0002117 A1* | 1/2010 | Iwane | .................. | H04N 25/778 |
| | | | | 257/E27.122 |

(Continued)

FOREIGN PATENT DOCUMENTS

| | | |
|---|---|---|
| JP | 2019004382 A | 1/2019 |
| JP | 2019012752 A | 1/2019 |
| JP | 2020107897 A | 7/2020 |

OTHER PUBLICATIONS

International Search Report (PCT/ISA/210), International Application No. PCT/JP2021/037504, dated Dec. 21, 2021.

*Primary Examiner* — Sinh Tran
*Assistant Examiner* — Zhenzhen Wu
(74) *Attorney, Agent, or Firm* — Michael Best & Friedrich LLP

(57) ABSTRACT

There is provided an imaging device capable of suppressing an occurrence of shading in any input image at any shutter timing when the fine shutter is implemented without restriction on the exposure time.

The imaging device includes a shutter function capable of performing a shutter operation at a desired timing within one horizontal synchronization period, in which in a pixel layout configuration in which pixels each including a photoelectric conversion unit are disposed in a matrix shape, a pixel control line is wired for each pixel row with respect to a matrix-like pixel array, and a vertical signal line and a power supply line of a high-potential-side power supply voltage are wired for each pixel column in a wiring layer different from (Continued)

a wiring layer in which the pixel control line is wired, the vertical signal line is shielded by a shielding power supply line of a low-potential-side power supply voltage.

18 Claims, 19 Drawing Sheets

(51) Int. Cl.
 *H04N 25/709* (2023.01)
 *H04N 25/76* (2023.01)

(58) Field of Classification Search
 CPC ...... H04N 25/53; H04N 25/76; H10F 39/182;
  H10F 39/803; H10F 39/8057
 See application file for complete search history.

(56) References Cited

U.S. PATENT DOCUMENTS

| | | | |
|---|---|---|---|
| 2013/0057754 A1* | 3/2013 | Shimada .............. | H04N 25/771 348/362 |
| 2014/0240563 A1* | 8/2014 | Nakaseko .......... | H04N 25/7795 348/296 |
| 2017/0110503 A1* | 4/2017 | Kato ..................... | H10F 39/802 |
| 2019/0007635 A1* | 1/2019 | Wada ................... | H04N 25/671 |
| 2021/0343777 A1* | 11/2021 | Otake .................. | H04N 25/771 |
| 2022/0094867 A1* | 3/2022 | Takado ................. | H04N 25/59 |

* cited by examiner

FIG. 1

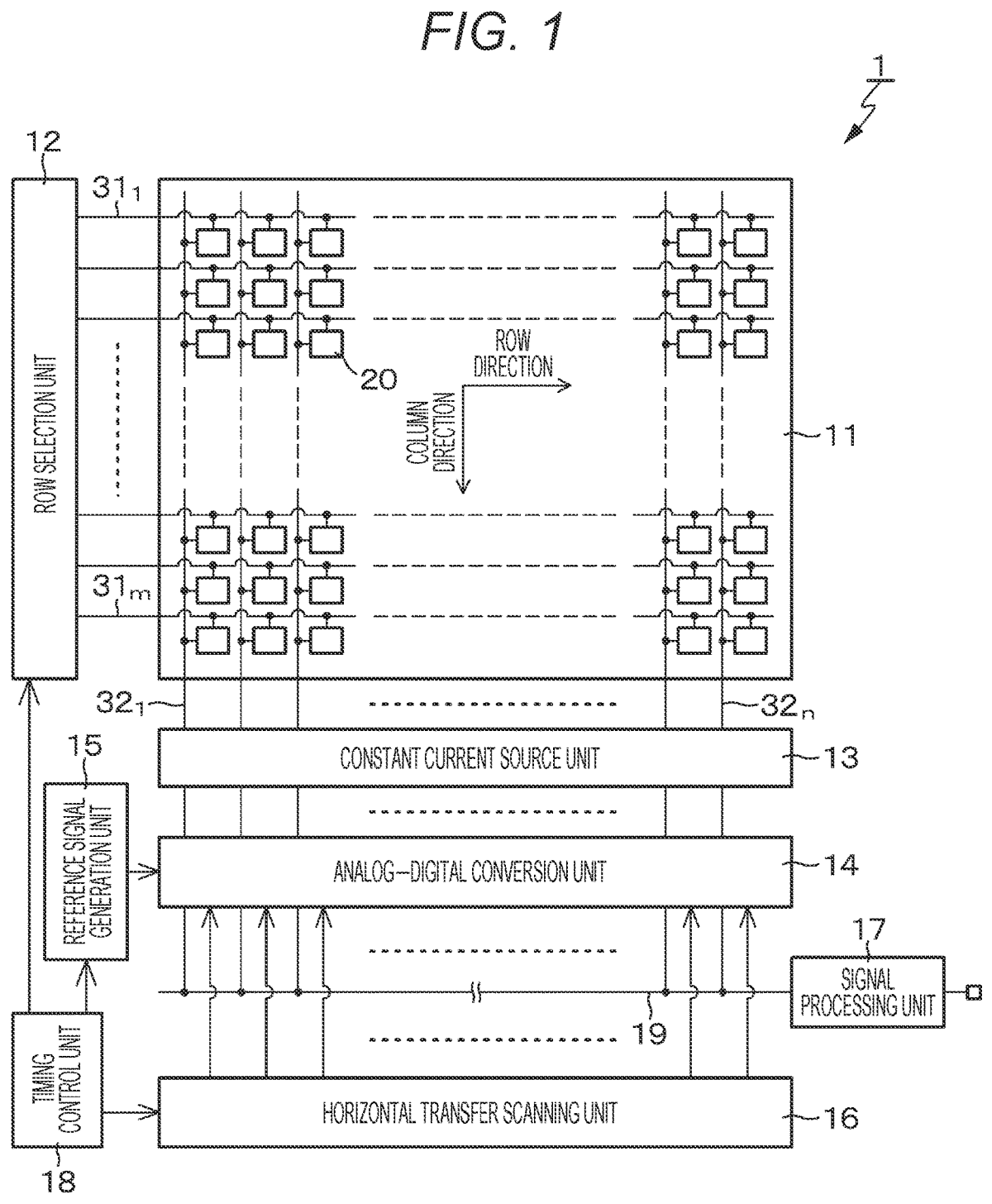

ROW SELECTION UNIT — 12

$31_1$ $31_m$

20

11

ROW DIRECTION

COLUMN DIRECTION $32_1$      $32_n$

CONSTANT CURRENT SOURCE UNIT — 13

ANALOG–DIGITAL CONVERSION UNIT — 14

REFERENCE SIGNAL GENERATION UNIT — 15

SIGNAL PROCESSING UNIT — 17

19

TIMING CONTROL UNIT — 18

HORIZONTAL TRANSFER SCANNING UNIT — 16

TO ANALOG—DIGITAL
CONVERSION UNIT

FIG. 6

ONE HORIZONTAL
SYNCHRONIZATION PERIOD

HORIZONTAL
SYNCHRONIZATION PERIOD XHS

TRANSFER SIGNAL RTRG
AT TIME OF READING

TRANSFER SIGNAL STRG
AT TIME OF ELECTRONIC SHUTTER

RESET SIGNAL SRST
AT TIME OF ELECTRONIC SHUTTER

RESET SIGNAL RRST
AT TIME OF READING

SELECTION SIGNAL RSEL
AT TIME OF READING

HORIZONTAL SYNCHRONIZATION SIGNAL

TRANSFER SIGNAL AT TIME OF ELECTRONIC SHUTTER $T_{21}$  $T_{22}$ $t_{21}$  $t_{22}$  $t_{23}$ TIME

HORIZONTAL SYNCHRONIZATION SIGNAL

ADDRESS DECODER

TIMING OF ADDRESS TRANSFER

TIMING OF SHUTTER $T_{21}$  $T_{22}$ $t_{31}$  $t_{32}$  TIME

: FOURTH WIRING LAYER
: THIRD WIRING LAYER
: SECOND WIRING LAYER

IMAGING DEVICE AND ELECTRONIC APPARATUS

TECHNICAL FIELD

The present disclosure relates to an imaging device and an electronic apparatus.

BACKGROUND ART

In the imaging device, as a method of expanding a dynamic range of the imaging device, a method of continuously capturing a plurality of images at different exposure times and synthesizing the images is known. Specifically, for example, the method is a method of generating one image by performing synthesis processing in which a long-time exposure image and a short-time exposure image are continuously and individually captured, the long-time exposure image is used for a dark image region, and the short-time exposure image is used for a bright image region in which halation occurs in the long-time exposure image. By synthesizing a plurality of different exposure images in this manner, it is possible to obtain a high dynamic range image without halation.

Here, in a case where processing of separately capturing the long-time exposure image and the short-time exposure image and synthesizing the images is performed, it is required to adjust the exposure time at the time of capturing the long-time exposure image and the exposure time at the time of capturing the short-time exposure image appropriately. In order to meet this requirement, there is proposed a shutter technique capable of more finely adjusting the exposure time (hereinafter, for convenience, it may be described as "fine shutter") without restriction on the exposure time (refer to, for example, Patent Document 1).

CITATION LIST

Patent Document

Patent Document 1: Japanese Patent Application Laid-Open No. 2019-4382

SUMMARY OF THE INVENTION

Problems to be Solved by the Invention

In the imaging device having a fine shutter function without restriction on the exposure time as described above, it is desirable to be capable of suppressing the occurrence of shading in any input image at any shutter timing.

Therefore, an object of the present disclosure is to provide an imaging device capable of suppressing the occurrence of shading in any input image at any shutter timing in implementing a fine shutter without restriction on the exposure time, and an electronic apparatus including the imaging device.

Solutions to Problems

An imaging device of the present disclosure for achieving the above-described object includes
  a shutter function capable of performing a shutter operation at a desired timing within one horizontal synchronization period,
  in which in a pixel layout configuration in which pixels each including a photoelectric conversion unit are disposed in a matrix shape, a pixel control line is wired for each pixel row with respect to a matrix-like pixel array, and a vertical signal line and a power supply line of a high-potential-side power supply voltage are wired for each pixel column in a wiring layer different from a wiring layer in which the pixel control line is wired,
  the vertical signal line is shielded by a shielding power supply line of a low-potential-side power supply voltage.

Furthermore, an electronic apparatus of the present disclosure for achieving the above-described object includes the imaging device having the above-described configuration.

BRIEF DESCRIPTION OF DRAWINGS

FIG. 1 is a block diagram schematically illustrating an overall basic configuration of a CMOS image sensor which is an example of an imaging device to which the technology according to the present disclosure is applied.

FIG. 6 is a timing chart for explaining a shutter timing when a dynamic range is achieved and a reading timing.

FIG. 17 is a block diagram schematically illustrating a configuration example of an imaging system which is an example of an electronic apparatus of the present disclosure.

MODE FOR CARRYING OUT THE INVENTION

Figure 2:
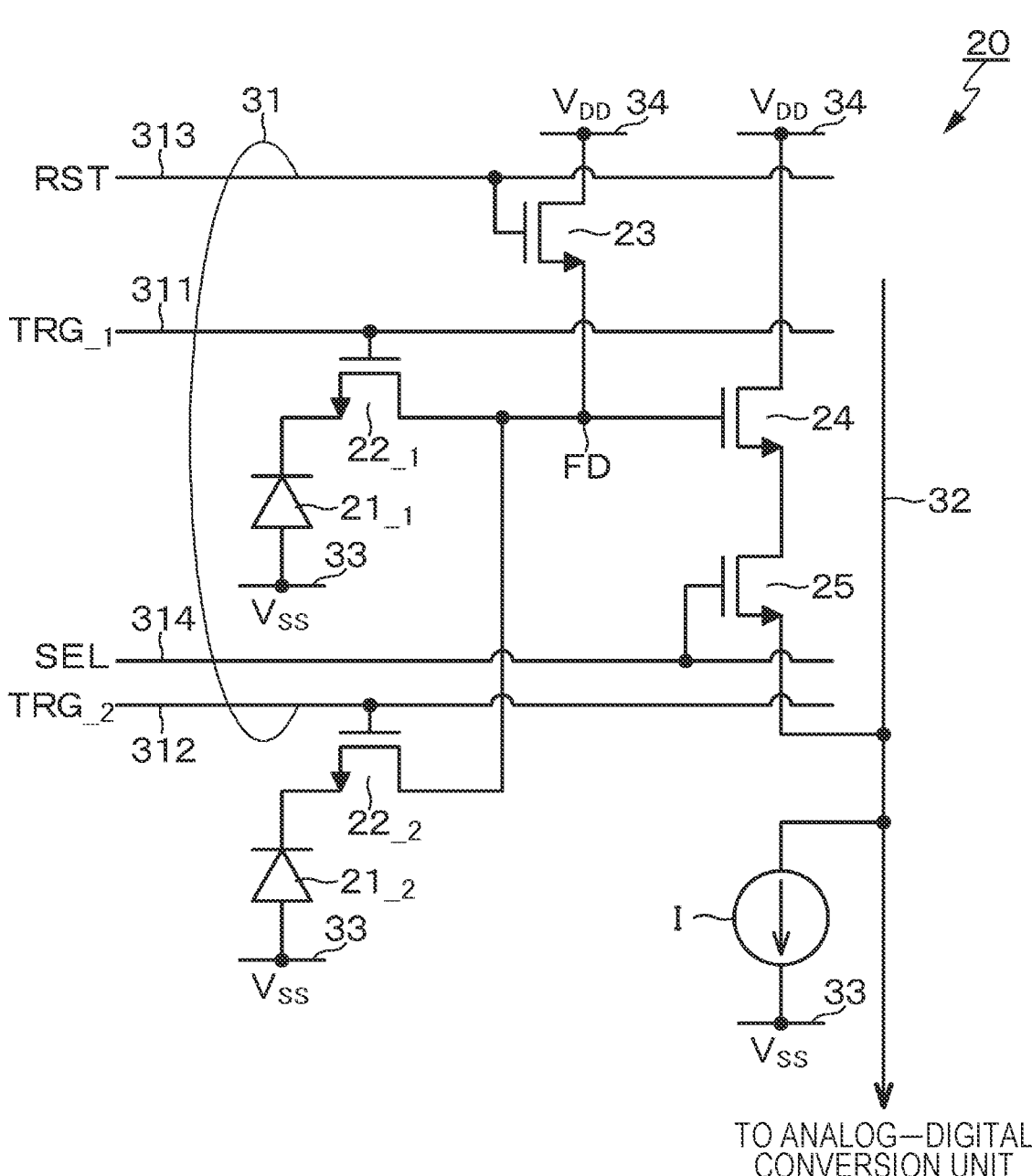
FIG. 2 is a circuit diagram illustrating an example of a circuit configuration of a pixel in which some circuit elements are shared by a plurality of pixels.

Hereinafter, modes for carrying out the technology according to the present disclosure (hereinafter, it is described as "embodiment") will be described in detail with reference to the drawings. The technology according to the present disclosure is not limited to the embodiment. In the following description, the same reference numerals will be used for the same elements or elements having the same functions, and overlapping description will be omitted. Note that the description will be made in the following order.

1. Description of Imaging Device and Electronic Apparatus according to Present Disclosure and Overall Aspect.
2. Imaging Device to which Technology according to Present Disclosure is Applied
2-1. Configuration Example of CMOS Image Sensor
2-2. Circuit Configuration Example of Pixel
2-3. Configuration Example of Analog-Digital Conversion Unit
2-4. Semiconductor Chip Structure
2-5. Arrangement Example of Pixel
2-6. Regarding High Dynamic Range
2-7. Regarding Fine Shutter
2-8. Regarding Problem of Shading peculiar to Fine Shutter
3. Embodiment of Present Disclosure
3-1. First Example
3-2. Second Example
3-3. Third Example
3-4. Fourth Example
4. Modification Example
5. Application Example
6. Application Example of Technology according to Present Disclosure
6-1. Electronic Apparatus of Present Disclosure (Example of Imaging System)
6-2. Application example to Mobile Body
7. Configuration that Can be Used in Present Disclosure <Description of Imaging Device and Electronic Apparatus according to Present Disclosure and Overall Aspect>

The imaging device and the electronic apparatus of the present disclosure can be configured to have a function of generating an image with a high dynamic range by capturing a plurality of images at different exposure times and synthesizing a plurality of the images to generate one image.

In the imaging device and the electronic apparatus of the present disclosure, which include the above-described preferable configuration, a plurality of the images having different exposure times can be a long-time exposure image having a relatively long exposure time and a short-time exposure image having a relatively short exposure time. Furthermore, the exposure time at the time of capturing the long-time exposure image and the exposure time at the time of capturing the short-time exposure image can be individually adjusted by using a shutter function capable of performing a shutter operation at a desired timing within one horizontal synchronization period.

Furthermore, in the imaging device and the electronic apparatus of the present disclosure, which include the above-described preferable configuration, when the existing power supply line of a low-potential-side power supply voltage is wired, in a state of being disposed in parallel with the pixel control line, in a wiring layer in which a pixel control line is wired, the shielding power supply line of the low-potential-side power supply voltage can be wired in a state of being disposed in parallel with the pixel control line on the opposite side of the existing power supply line of the low-potential-side power supply voltage. Alternatively, the shielding power supply line of the low-potential-side power supply voltage can be wired in a state of being disposed in parallel with a vertical signal line in the wiring layer in which the vertical signal line is wired, more specifically, can be wired between the vertical signal line and the power supply line of a high-potential-side power supply voltage.

Alternatively, in the imaging device and the electronic apparatus of the present disclosure, which include the above-described preferable configuration, when the vertical signal line is wired in a wiring layer different from a wiring layer in which the power supply line of the high-potential-side power supply voltage is wired, the shielding power supply line of the low-potential-side power supply voltage can be wired in the wiring layer in which the power supply line of the high-potential-side power supply voltage is wired.

Furthermore, in the imaging device and the electronic apparatus of the present disclosure, which include the above-described preferable configuration, when the pixel includes a transfer transistor that transfers an electric charge photoelectrically converted by a photoelectric conversion unit to a charge-voltage conversion unit, the pixel control line can be a transfer control line that transfers a drive signal to the transfer transistor. Moreover, when the pixel includes a reset transistor that resets the charge-voltage conversion unit, the pixel control line can be a reset control line that transfers a drive signal to the reset transistor.

<Imaging Device of Present Disclosure>

First, a basic configuration of the imaging device (that is, the imaging device of the present disclosure) to which the technology according to the present disclosure is applied will be described. Here, a complementary metal oxide semiconductor (CMOS) image sensor, which is a type of X-Y address imaging device, will be described as an example of the imaging device. The CMOS image sensor is an image sensor manufactured by applying or partially using a CMOS process.

[Configuration Example of CMOS Image Sensor]

FIG. 1 is a block diagram illustrating an overall basic configuration of the CMOS image sensor which is an example of the imaging device according to the present disclosure.

A CMOS image sensor 1 according to the present example includes a pixel array unit 11 and a peripheral circuit unit of the pixel array unit 11. The pixel array unit 11 is formed by two-dimensionally disposing pixels (pixel circuits) 20 each including a photoelectric conversion unit (light reception unit) in a row direction and a column direction, that is, in a matrix shape. Here, the row direction refers to the arrangement direction (so-called horizontal direction) of the pixels 20 in the pixel row, and the column direction refers to the arrangement direction (so-called vertical direction) of the pixels 20 in the pixel column. The pixels 20 performs photoelectric conversion to generate photoelectric charge corresponding to the amount of received light and accumulates the generated photoelectric charge.

The peripheral circuit unit of the pixel array unit 11 includes, for example, a row selection unit 12, a constant current source unit 13, an analog-digital conversion unit 14, a reference signal generation unit 15, a horizontal transfer scanning unit 16, a signal processing unit 17, and a timing control unit 18.

In the pixel array unit 11, a pixel control line 31 ($31_1$ to $31_m$) is wired in the row direction (horizontal direction) for each pixel row with respect to the matrix-like pixel array. Furthermore, a vertical signal line 32 ($32_1$ to $32_n$) is wired in the column direction (vertical direction) for each pixel column. The pixel control line 31 transfers a drive signal for performing driving when reading a signal from each of the pixels 20. In FIG. 1, the pixel control line 31 is illustrated as one wiring, but is not limited to one, and details thereof will be described later. One end of the pixel control line 31 is connected to an output terminal corresponding to each row of the row selection unit 12.

Components of the peripheral circuit unit of the pixel array unit 11, for example, the row selection unit 12, the constant current source unit 13, the analog-digital conversion unit 14, the reference signal generation unit 15, the horizontal transfer scanning unit 16, the signal processing unit 17, and the timing control unit 18 will be described below.

The row selection unit 12 includes a shift register and an address decoder, and controls scanning of a pixel row and an address of the pixel row when selecting each pixel 20 of the pixel array unit 11. Although a specific configuration of the row selection unit 12 is not illustrated, the row selection unit 12 generally includes two scanning systems, for example, a read scanning system and a sweep scanning system.

In order to read pixel signals from the pixels 20, the read scanning system sequentially selects and scans the pixels 20 of the pixel array unit 11 row by row. Each of the pixel signals read from each of the pixels 20 is an analog signal. The sweep scanning system performs sweep scanning on a read row on which the read scanning is performed by the read scanning system prior to the read scanning by a time corresponding to a shutter speed.

By the sweep scanning by the sweep scanning system, unnecessary electric charges are swept from the photoelectric conversion units of the pixels 20 in the read row, and thus the photoelectric conversion units are reset. Then, by sweeping (resetting) the unnecessary electric charges by the sweeping scanning system, a so-called electronic shutter operation is performed. Here, the electronic shutter operation refers to an operation of sweeping the photoelectric charges of the photoelectric conversion unit and newly starting exposure (starting accumulation of the photoelectric charges).

The constant current source unit 13 includes a current source I including, for example, a MOS transistor connected to each of the vertical signal lines $32_1$ to $32_n$ for each pixel column, and supplies a bias current to each pixel 20 of the pixel row selectively scanned by the row selection unit 12 through each of the vertical signal lines $32_1$ to $32_n$.

The analog-digital conversion unit 14 includes a set of a plurality of analog-digital converters provided (for example, for pixel columns) corresponding to the pixel columns of the pixel array unit 11. The analog-digital conversion unit 14 is a column parallel analog-digital conversion unit that converts an analog pixel signal output through each of the vertical signal lines $32_1$ to $32_n$ for each pixel column into a digital signal.

As each of the analog-digital converters in the column parallel analog-digital conversion unit 14, for example, a single slope analog-digital converter that is an example of a reference signal comparison analog-digital converter can be used. However, the analog-digital converter is not limited to the single slope analog-digital converter, and a successive approximation analog-digital converter, a delta-sigma modulation (GE modulation) analog-digital converter, or the like can be used.

The reference signal generation unit 15 includes a digital-analog (DA) converter, and generates a ramp-wave reference signal of which a level (voltage) monotonously decreases with the lapse of time. The ramp-wave reference signal generated by the reference signal generation unit 15 is supplied to the analog-digital conversion unit 14 and used as a reference signal at the time of analog-digital conversion.

The horizontal transfer scanning unit 16 includes a shift register and an address decoder, and controls scanning of a pixel column and an address of the pixel column when reading a signal of each pixel circuit (pixel) 2 of the pixel array unit 11. Under the control of the horizontal transfer scanning unit 16, the pixel signal converted into the digital signal by the analog-digital conversion unit 14 is read to a horizontal transfer line 19 in units of pixel columns.

The signal processing unit 17 performs predetermined signal processing on the digital pixel signal supplied through the horizontal transfer line 19 to generate two-dimensional image data. Specifically, for example, the signal processing unit 17 corrects a vertical line defect or a point defect, clamps a signal, or performs digital signal processing such as parallel-to-serial conversion, compression, encoding, addition, averaging, and intermittent operation. The signal processing unit 17 outputs, to a post-stage device, the generated image data as an output signal of the CMOS image sensor 1.

The timing control unit 18 generates various timing signals, clock signals, control signals, and the like, and performs drive control on the row selection unit 12, the constant current source unit 13, the analog-digital conversion unit 14, the reference signal generation unit 15, the horizontal transfer scanning unit 16, the signal processing unit 17, and the like on the basis of the generated signals.

[Circuit Configuration Example of Pixel]

Here, an example of a circuit configuration of the pixel 20, in which some circuit elements are shared by a plurality of pixels, for example, two pixels, is provided. FIG. 2 illustrates an example of the circuit configuration of the pixel 20 in which some circuit elements are shared by two pixels.

As illustrated in FIG. 2, the pixel 20 includes, for example, two photodiodes $21_{-2}$ and $21_{-2}$ as photoelectric conversion units (photoelectric conversion elements). Here, the circuit configuration of the pixel is illustrated as a circuit configuration of one pixel 20, but two photodiodes $21_{-1}$ and $21_{-2}$ are referred to as photoelectric conversion units (photoelectric conversion elements) of two pixels sharing some circuit elements.

The pixel 20 includes two transfer transistors $22_{-1}$ and $22_{-2}$ corresponding to two photodiodes $21_{-1}$ and $21_{-2}$, respectively. Two transfer transistors $22_{-1}$ and $22_{-2}$ constitute two pixels sharing some circuit elements together with two photodiodes $21_{-1}$ and $21_{-2}$.

The pixel 20 includes a reset transistor 23, an amplification transistor 24, and a selection transistor 25 in addition to two photodiodes $21_{-1}$ and $21_{-2}$ and two transfer transistors $22_{-1}$ and $22_{-2}$. Then, a circuit configuration is adopted in which the reset transistor 23, the amplification transistor 24, and the selection transistor 25, which are parts of the circuit elements, are shared by two pixels respectively including the photodiodes $21_{-1}$ and $21_{-2}$.

In the present circuit configuration example, as five transistors of the transfer transistors $22_{-1}$ and $22_{-2}$, the reset transistor 23, the amplification transistor 24, and the selection transistor 25, for example, N-channel MOS field effect transistors (FET) are used. However, the combination of the conductivity types of five transistors 22$_{-1}$ and 22$_{-2}$ to 25 exemplified here is merely an example, and the combination thereof is not limited to this.

For the pixel 20 having the above-described circuit configuration, a plurality of pixel control lines, specifically, a transfer control line 311, a transfer control line 312, a reset control line 313, and a selection control line 314 are wired in common for each pixel 20 of the same pixel row as the above-described pixel control line 31. A plurality of these pixel control lines 311 to 314 is connected to an output terminal corresponding to each pixel row of the row selection unit 12 in units of pixel rows. The row selection unit 12 appropriately outputs a transfer signal TRG$_{-1}$, a transfer signal TRG$_{-2}$, a reset signal RST, and a selection signal SEL to the transfer control line 311, the transfer control line 312, the reset control line 313, and the selection control line 314.

Each of the photodiodes 21$_{-1}$ and 21$_{-2}$ has an anode electrode connected to a power supply line 33 of a low-potential-side power supply voltage (for example, ground level) V$_{SS}$, and photoelectrically converts received light into photoelectric charge (here, photoelectron) of a charge amount corresponding to the received light amount to accumulates the photoelectric charge. A cathode electrode of each of the photodiodes 21$_{-1}$ and 21$_{-2}$ is electrically connected to a gate electrode of the amplification transistor 24 via the transfer transistors 22$_{-1}$ and 22$_{-2}$. Here, a region in which a gate electrode of the amplification transistor 24 is electrically connected is a floating diffusion (floating diffusion region/impurity diffusion region) FD. The floating diffusion FD is a charge-voltage conversion unit that converts electric charge into a voltage.

The transfer signals TRG$_{-1}$ and TRG$_{-2}$ that are in an active state at a high level (for example, high-potential-side power supply voltage V$_{DD}$) are supplied to the gate electrode of each of the transfer transistors 22$_{-1}$ and 22$_{-2}$ from the row selection unit 12 through the transfer control lines 311 and 312. The transfer transistors 22$_{-1}$ and 22$_{-2}$ become conductive in response to the transfer signals TRG$_{-1}$ and TRG$_{-2}$. Therefore, the photoelectric charges photoelectrically converted by the photodiodes 21$_{-1}$ and 21$_{-2}$ and accumulated in the photodiodes 21$_{-1}$ and 21$_{-2}$ are transferred to the floating diffusion FD.

The reset transistor 23 is connected between the power supply line 34 of the high-potential-side power supply voltage V$_{DD}$ and the floating diffusion FD. The reset signal RST that is in an active state at a high level is supplied to a gate electrode of the reset transistor 23 from the row selection unit 12 through the reset control line 313. The reset transistor 23 becomes conductive in response to the reset signal RST, and resets the floating diffusion FD by sweeping the electric charge of the floating diffusion FD to the power supply node of the voltage V$_{DD}$.

The amplification transistor 24 has a gate electrode connected to the floating diffusion FD and a drain electrode connected to the power supply line 34 of the high-potential-side power supply voltage V$_{DD}$. The amplification transistor 24 serves as an input unit of a source follower that reads a signal obtained by photoelectric conversion in the photodiodes 21$_{-1}$ and 21$_{-2}$. That is, the amplification transistor 24 has a source electrode connected to the vertical signal line 32 via the selection transistor 25. Then, the amplification transistor 24 and the current source I connected to one end of the vertical signal line 32 constitute a source follower that converts the voltage of the floating diffusion FD into the potential of the vertical signal line 32.

The selection transistor 25 has a drain electrode connected to the source electrode of the amplification transistor 24, and a source electrode connected to the vertical signal line 32. The selection signal SEL that is in an active state at a high level is supplied to a gate electrode of the selection transistor 25 from the row selection unit 12 through the selection control line 314. The selection transistor 25 becomes conductive in response to the selection signal SEL, and thus the signal output from the amplification transistor 24 is transferred to the vertical signal line 32 with the pixel 20 in a selection state.

Note that the circuit configuration of the pixel 20 described above is an example, and is not limited to the circuit configuration. Specifically, for example, a circuit configuration can be made by giving a function of the selection transistor 25 to the amplification transistor 24 without the selection transistor 25 and, as necessary, a circuit configuration can be made by increasing the number of transistors.

[Configuration Example of Analog-Digital Conversion Unit]

Figure 3:
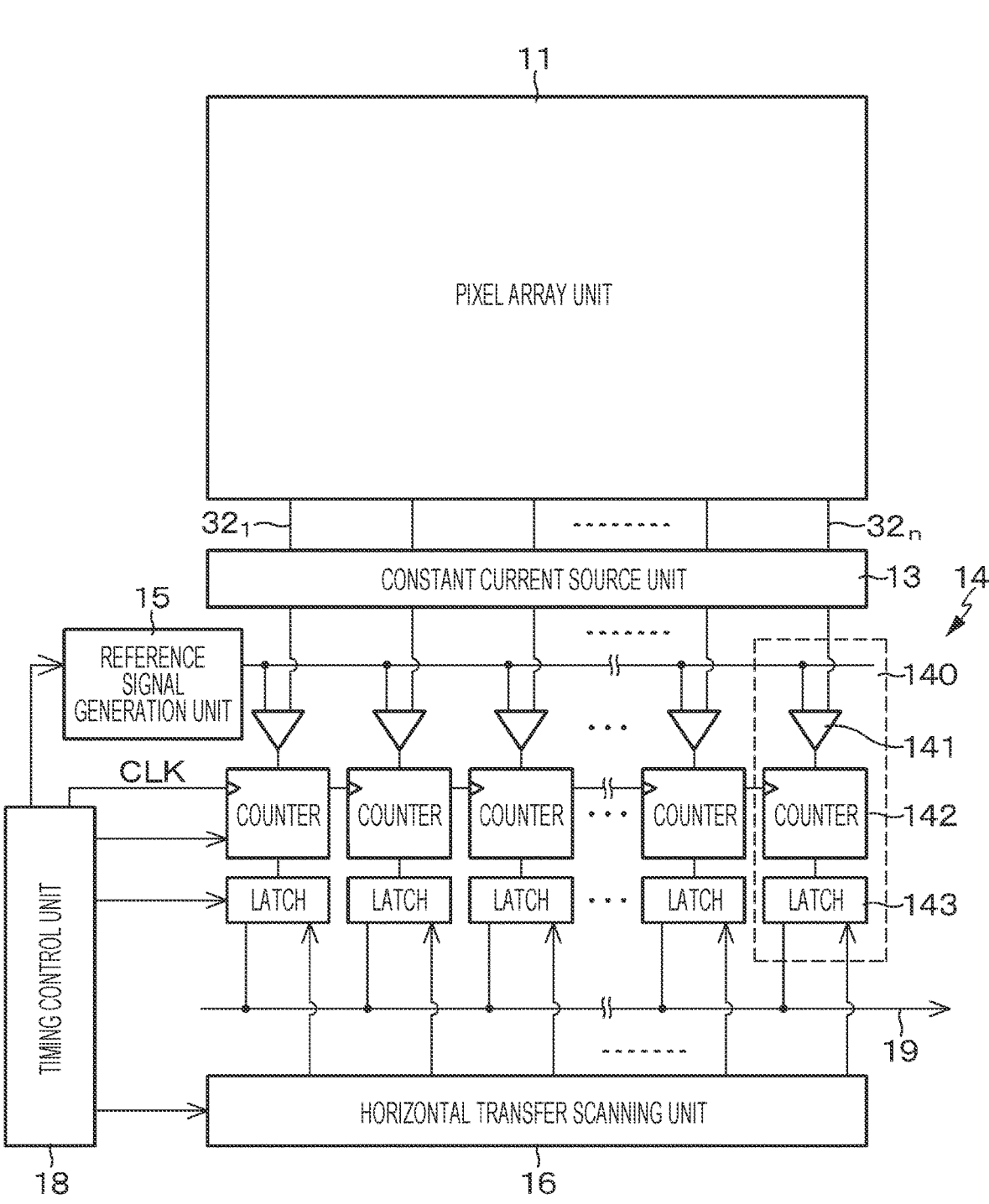
FIG. 3 is a block diagram illustrating an example of a configuration of a column parallel analog-digital conversion unit mounted on a CMOS image sensor.

Next, a configuration example of the column parallel analog-digital conversion unit 14 will be described. FIG. 3 illustrates an example of the configuration of the column parallel analog-digital conversion unit 14. Here, in a case where the analog-digital conversion unit 14 includes a set of a plurality of single-slope analog-digital converters provided to be respectively corresponding to the pixels 20 of the pixel array unit 11, a single slope analog-digital converter 140 in n-th column will be described as an example.

The single slope analog-digital converter 140 has a circuit configuration including a comparator 141, a counter circuit 142, and a latch circuit 143. In the single slope analog-digital converter 140, a ramp-wave reference signal generated by the reference signal generation unit 15 is used. Specifically, the ramp-wave reference signal is supplied, as a reference signal, to the comparator 141 provided for each pixel column.

The comparator 141 uses the analog pixel signal read from the pixel 20 as comparison input and the ramp-wave reference signal generated by the reference signal generation unit 15 as reference input, and compares both signals. Then, for example, when the reference signal is greater than the pixel signal, the output of the comparator 141 is in a first state (for example, at high level), and when the reference signal is equal to or less than the pixel signal, the output of the comparator 141 is in a second state (for example, at low level). Therefore, the comparator 141 outputs, as a comparison result, a pulse signal having a pulse width corresponding to the signal level of the pixel signal, specifically, the magnitude of the signal level.

A clock signal CLK is supplied from the timing control unit 18 to the counter circuit 142 at the same timing as the supply start timing of the reference signal to the comparator 141. Then, the counter circuit 142 performs counting operation in synchronization with the clock signal CLK to measure a period of the pulse width of the output pulse of the comparator 141, that is, a period from the start of the comparison operation to the end of the comparison operation. The measurement result (count value) of the counter circuit 142 is a digital value obtained by digitizing the analog pixel signal.

The latch circuit 143 holds (latches) a digital value which is a counting result of the counter circuit 142. Furthermore, the latch circuit 143 performs correlated double sampling (CDS) processing, which is an example of noise removal processing, by taking a difference between a D-phase count value corresponding to the signal level at the time of photoelectric conversion of the pixel 20 and a P-phase count value corresponding to a reset level at the time of resetting the pixel 20. Then, in the driving by the horizontal transfer scanning unit 16, the latched digital value is output to the horizontal transfer line 19.

As described above, in the column parallel analog-digital conversion unit 14 including a set of the single slope analog-digital converters 140, a digital value is obtained from information regarding a time until a magnitude relationship between the reference signal of a linearly changing analog value, which is generated by the reference signal generation unit 15, and the analog pixel signal output from the pixel 20 changes.

Note that, in the above-described example, the configuration in which the analog-digital converter 140 is disposed in a one-to-one relationship with respect to the pixel column has been described as the column parallel analog-digital conversion unit 14, but a configuration in which the analog-digital converters 140 are disposed in units of a plurality of pixel columns can also be used.

[Semiconductor Chip Structure]

Examples of the semiconductor chip structure of the CMOS image sensor 1 having the above-described configuration include a flat semiconductor chip structure formed by a single semiconductor chip and a stacked semiconductor chip structure formed by stacking a plurality of semiconductor chips. Furthermore, regarding a pixel structure, when a substrate surface on which the wiring layer is formed is defined as a front surface, a back surface irradiation pixel structure in which light radiated from a back surface on the opposite side of the front surface is received can be used, or a front surface irradiation pixel structure in which light radiated from the front surface is received can be used.

Here, the stacked semiconductor chip structure will be described as an example of the semiconductor chip structure of the CMOS image sensor 1.

Figure 4:
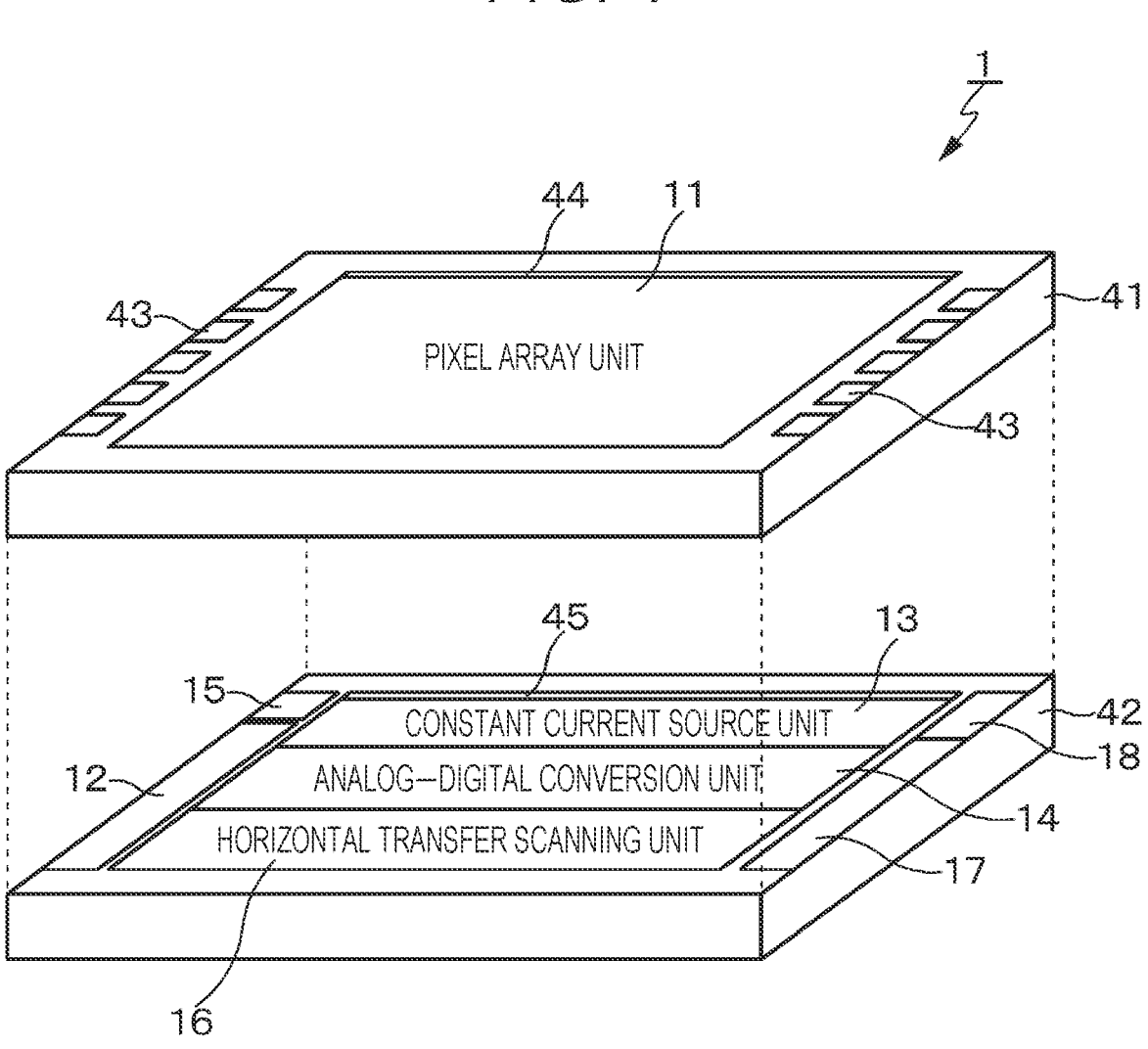
FIG. 4 is an exploded perspective view schematically illustrating an overall stacked semiconductor chip structure of a CMOS image sensor.

FIG. 4 is an exploded perspective view schematically illustrating an overall stacked semiconductor chip structure of the CMOS image sensor 1. As illustrated in FIG. 4, the stacked semiconductor chip structure according to the present example has a structure in which at least two semiconductor chips of a first-layer semiconductor chip 41 and a second-layer semiconductor chip 42 are stacked.

In this stacked semiconductor chip structure, the first-layer semiconductor chip 41 is a pixel chip in which the pixel array unit 11 in which the pixels 20 including photodiodes 21 are two-dimensionally disposed in a matrix shape is formed. Pads 43 for external connection and pads 43 for power supply are provided, for example, at both right and left ends of the first-layer semiconductor chip 41.

The second-layer semiconductor chip 42 is a circuit chip on which circuit units such as a row selection unit 12, a constant current source unit 13, an analog-digital conversion unit 14, a reference signal generation unit 15, a horizontal transfer scanning unit 16, a signal processing unit 17, and a timing control unit 18 are formed. Note that FIG. 4 schematically illustrates the arrangement of the row selection unit 12, the constant current source unit 13, the analog-digital conversion unit 14, the reference signal generation unit 15, the horizontal transfer scanning unit 16, the signal processing unit 17, the timing control unit 18, and the like, but this arrangement example is merely an example and is not limited to this arrangement example.

The pixel array unit 11 formed in the first-layer semiconductor chip 41 and the peripheral circuit unit formed in the second-layer semiconductor chip 42 are electrically connected via junctions 44 and 45 provided in both the semiconductor chips 41 and 42, the junctions 44 and 45 being a metal-metal junction such as a Cu—Cu junction, and formed by a through silicon via (TSV), a microbump, and the like.

In the stacked semiconductor chip structure described above, a process suitable for manufacturing the pixel array unit 11 can be applied to the first-layer semiconductor chip 41, and a process suitable for manufacturing the circuit portion can be applied to the second-layer semiconductor chip 42. Therefore, the process can be optimized in manufacturing the CMOS image sensor 1. In particular, an advanced process can be applied in manufacture the circuit portion of the second-layer semiconductor chip 42.

Note that, here, two-layer stacked semiconductor chip structure formed by stacking the first-layer semiconductor chip 41 and the second-layer semiconductor chip 42 has been described as an example, but the present disclosure is not limited to the two-layer stacked structure, and a stacked structure having three or more layers can be used.

[Arrangement Example of Pixel]

Figure 5A:
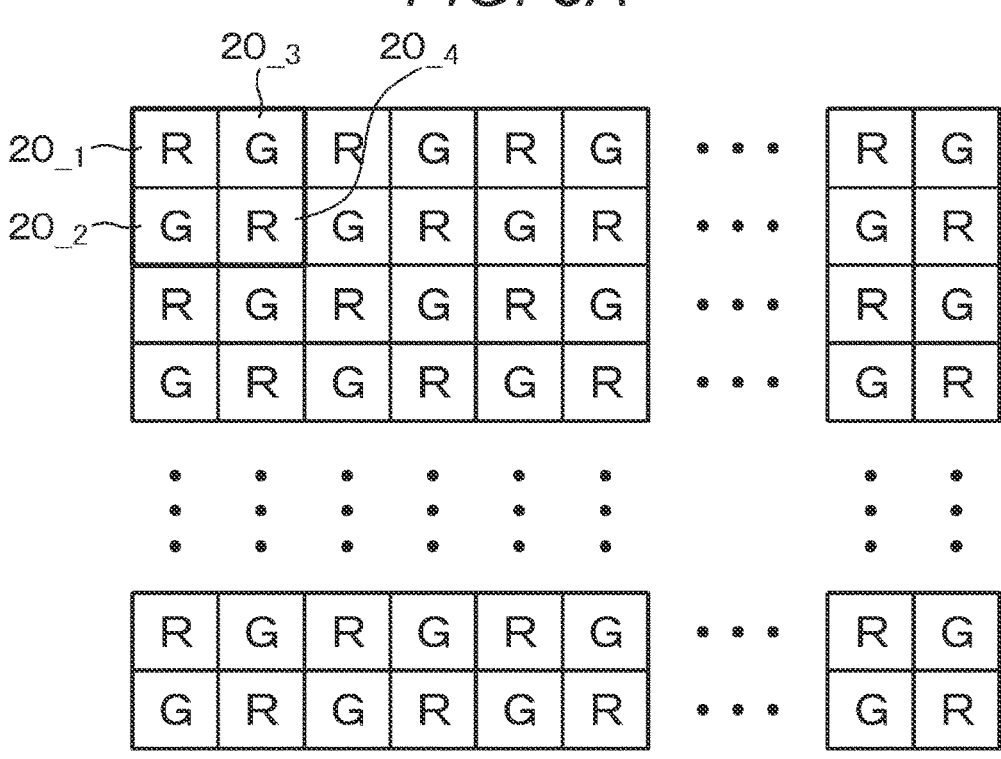
FIGS. 5A and 5B are explanatory diagrams of arrangement examples of pixels in a pixel array unit.
Figure 5B:
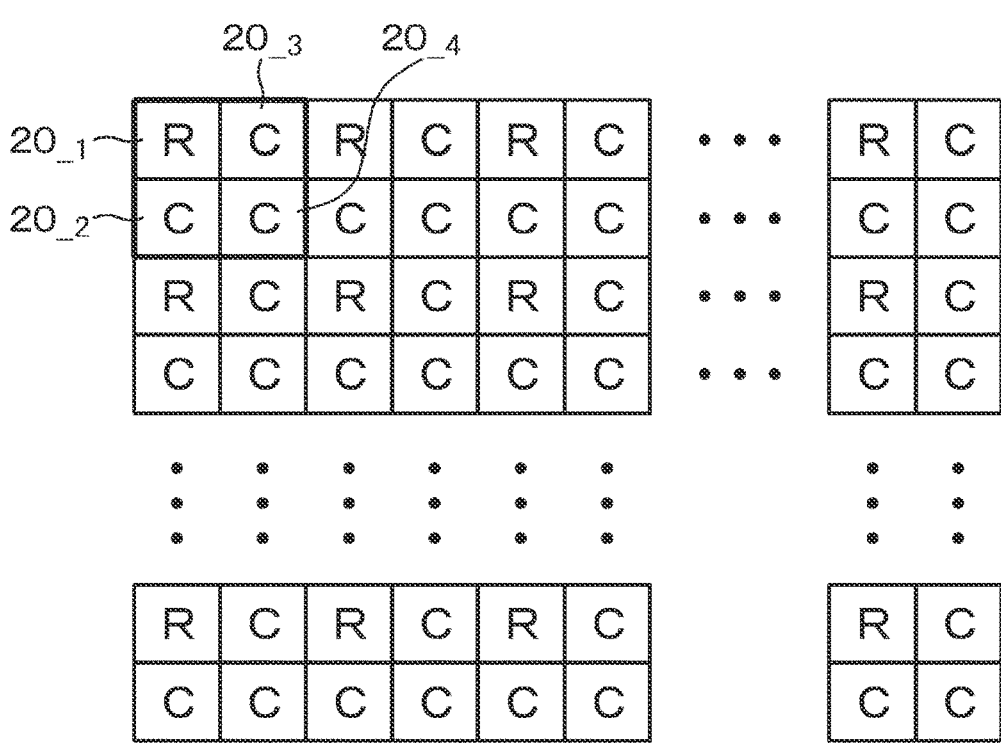

FIGS. 5A and 5B illustrate arrangement examples of the pixels 20 in the pixel array unit 11.

In FIG. 5A, a total of four pixels of horizontal two pixels x vertical two pixels are set as one unit, and in units of pixels, an upper left pixel $20_{-1}$ is an R pixel that mainly photoelectrically converts a red (R) band light, a lower left pixel $20_{-2}$ is a G pixel that mainly photoelectrically converts green (G) band light, an upper right pixel $20_{-3}$ is a G pixel that mainly photoelectrically converts green (G) band light, and a lower right pixel $20_{-4}$ is a B pixel that mainly photoelectrically converts blue (B) band light. With this pixel arrangement example, one unit of a Bayer array can be configured. Each of the R pixel, the G pixel, and the B pixel functions as a pixel having spectral sensitivity for each color.

In FIG. 5B, a total of four pixels of horizontal two pixels x vertical two pixels is set as one unit, in units of pixels, an upper left pixel $20_{-1}$ is an R pixel, and a lower left pixel $20_{-2}$, an upper right pixel $20_{-3}$, and a lower right pixel $20_{-4}$ are C (colorless) pixels having panchromatic spectral sensitivity. The C pixel is a pixel having higher sensitivity than those of the R pixel, the G pixel, and the B pixel. Therefore, in the pixel arrangement example of FIG. 5B in which the C pixel is provided, for example, a bright image is easily obtained even in a dark place. Therefore, for example, in the case of an in-vehicle imaging device, there is an advantage that a distant obstacle, a distant pedestrian, or the like can be imaged even under low illuminance corresponding to the night of moonlight, and a white front light, a red tail light, or the like of an automobile can be determined according to the intensity of red light.

Note that the pixel arrangement examples illustrated in FIGS. 5A and 5B are merely examples, and are not limited to these pixel arrangement examples. For example, in the pixel arrangement example illustrated in FIG. 5A, a C pixel may be disposed in one of two G pixels.

[Regarding High Dynamic Range]

The CMOS image sensor 1 having the configuration described above can generate an image with a high dynamic range by capturing a plurality of images at different exposure times and synthesizing a plurality of the images to generate one image.

Here, the high dynamic range will be described by taking, as an example, a case where three images are captured at different exposure times, and three images are synthesized to generate one image. Hereinafter, a long exposure time is described as long-time exposure, and an image captured by the long-time exposure is described as a long-time exposure image. A short exposure time is described as short-time exposure, and an image captured by the short-time exposure is described as a short-time exposure image. Hereinafter, an exposure time shorter than the long-time exposure and longer than the short-time exposure is described as a medium-time exposure, and an image captured by the medium-time exposure is described as a medium-time exposure image.

Note that, here, for example, a case where the long-time exposure image, the medium-time exposure image, and the short-time exposure image respectively captured by the long-time exposure, the medium-time exposure, and the short-time exposure are subjected to synthesis processing will be described as an example of achieving a high dynamic range, but the present disclosure is not limited to the synthesis processing on three images. Specifically, for example, the high dynamic range can be achieved by synthesizing two images captured at two exposure times (long-time exposure and the short-time exposure) different from each other.

The long-time exposure image, the medium-time exposure image, and the short-time exposure image are captured by shifting the time. For example, after the long-time exposure image is captured, the medium-time exposure image is captured, and after the medium-time exposure image is captured, the short-time exposure image is captured. Here, the description will be continued by exemplifying the case where the long-time exposure image, the medium-time exposure image, and the short-time exposure image are captured in this order, but the short-time exposure image, the medium-time exposure image, and the long-time exposure image may be captured in this order.

Imaging with the high dynamic range will be described with reference to FIG. 6. Here, the description will be continued by using, as an example, the pixel arrangement example illustrated in FIG. 5B, that is, the case of the pixel arrangement example in which the R pixel and the C pixel are disposed, and the description will be given assuming that the R pixel and the C pixel disposed in a longitudinal direction (vertical direction/column direction) are included as one unit pixel and are sharing pixels sharing a part of the circuit (refer to FIG. 2).

Figure 6:
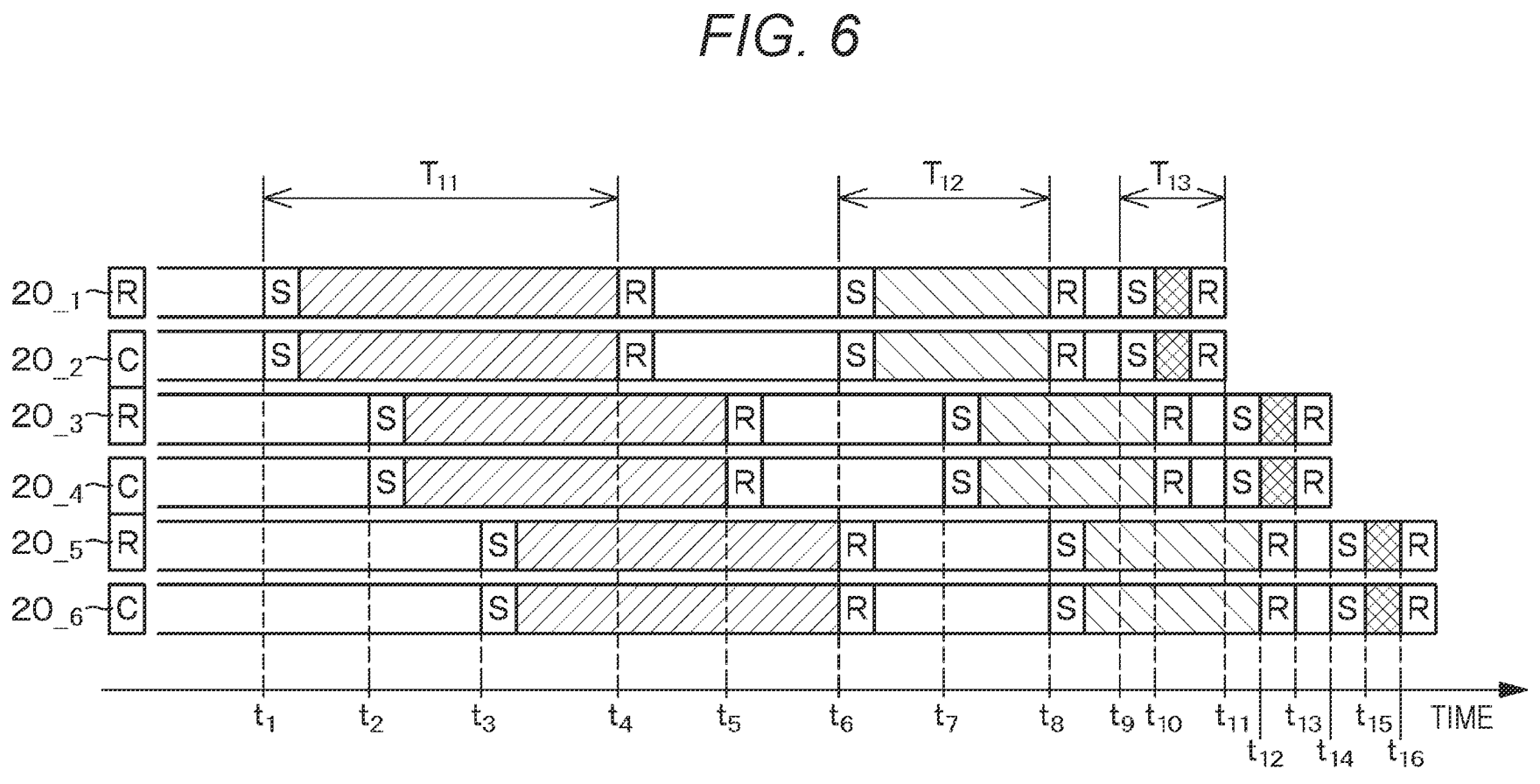

A part of the pixel group disposed in the pixel array unit 11 (refer to FIG. 1) is illustrated on the left side of FIG. 6. An R pixel $20_{-1}$, a C pixel $20_{-2}$, an R pixel $20_{-3}$, a C pixel $20_{-4}$, an R pixel $20_{-5}$, and a C pixel $20_{-6}$ are pixels disposed in the longitudinal direction (vertical direction/column direction). Furthermore, the C pixel $20_{-2}$ and the R pixel $20_{-3}$ are sharing pixels, and the C pixel $20_{-4}$ and the R pixel $20_{-5}$ are sharing pixels.

In a timing chart of FIG. 6, "S" indicated in a rectangle indicates a timing at which the shutter is released, and "R" indicates a reading timing. At time $t_1$, the shutter is released for the R pixel $20_{-1}$ and the C pixel $20_{-2}$, and exposure is started. At time $t_2$, the shutter is released for the R pixel $20_{-3}$ and the C pixel $20_{-4}$, and exposure is started. At time $t_3$, the shutter is released for the R pixel $20_{-5}$ and the C pixel $20_{-6}$, and exposure is started.

At time $t_4$, reading from the R pixel $20_{-1}$ and the C pixel $20_{-2}$ is started. The R pixel $20_{-1}$ and the C pixel $20_{-2}$ are exposed for time $T_{11}$ from time $t_1$ to time $t_4$, and the exposure for time $T_{11}$ is the long-time exposure. Similarly, the exposure is started from time $t_2$, and the reading from the R pixel $20_{-3}$ and the C pixel $20_{-4}$ is started at time $t_5$ after the lapse of time $T_{11}$ of the long-time exposure. Similarly, the exposure is started from time $t_3$, and the reading from the R pixel $20_{-5}$ and the C pixel $20_{-6}$ is started at time $t_6$ after the lapse of time $T_{11}$ of the long-time exposure.

Next, imaging by the medium-time exposure is started. At time $t_6$, the shutter is released for the R pixel $20_{-1}$ and the C pixel $20_{-2}$, and the exposure is started. At time $t_7$, the shutter is released for the R pixel $20_4$ and the C pixel $20_{-4}$, and the exposure is started. At time $t_8$, the shutter is released for the R pixel $20_{-5}$ and the C pixel $20_{-6}$, and the exposure is started.

At time $t_8$, the reading from the R pixel $20_{-1}$ and the C pixel $20_{-2}$ is started. The R pixel $20_{-1}$ and the C pixel $20_2$ are exposed for time $T_{12}$ from time $t_6$ to time $t_8$, and the exposure for time $T_{12}$ is the medium-time exposure. Similarly, the exposure is started from time $t_7$, and the reading from the R pixel $20_{-3}$ and the C pixel $20_{-4}$ is started at time $t_{10}$ after the lapse of time $T_{12}$ of the medium-time exposure. Similarly, the exposure is started from time $t_3$, and the reading from the R pixel $20_{-5}$ and the C pixel $20_{-6}$ is started at time $t_{13}$ after the lapse of time $T_{12}$ of the medium-time exposure.

Moreover, imaging by the short-time exposure is started. At time $t_9$, the shutter is released for the R pixel $20_{-1}$ and the C pixel $20_{-2}$, and the exposure is started. At time $t_{12}$, the shutter is released for the R pixel $20_{-3}$ and the C pixel $20_{-4}$, and the exposure is started. At time $t_{15}$, the shutter is released for the R pixel $20_{-5}$ and the C pixel $20_{-6}$, and the exposure is started.

At time $t_{11}$, the reading from the R pixel $20_{-1}$ and the C pixel $20_{-2}$ is started. The R pixel $20_{-1}$ and the C pixel $20_{-2}$ are exposed for time $T_{13}$ from time t, to time $t_{11}$, and the exposure for time $T_{13}$ is the short-time exposure. Similarly, the exposure is started from time $t_{13}$, and the reading from the R pixel $20_{-3}$ and the C pixel $20_{-4}$ is started at time $t_{14}$ after the lapse of time $T_{13}$ of the short-time exposure. Similarly, the exposure is started from time $t_{15}$, and the reading from the R pixel $20_{-5}$ and the C pixel $20_{-6}$ is started at time $t_{16}$ after the lapse of time $T_{13}$ of the short-time exposure.

Time $T_{11}$ of the long-time exposure time, time $T_{12}$ of the medium-time exposure time, and time $T_{13}$ of the short-time exposure time have the following relationship.

$$T_{11} > T_{12} > T_{13}$$

Here, for example, focusing on the R pixel $20_{-1}$, as illustrated in FIG. 6, the shutter is released for the R pixel $20_{-1}$ at time $t_1$. That is, at time $t_1$, the exposure is started by outputting a transfer signal STRG at the time of an electronic shutter and a reset signal SRST at the time of an electronic shutter to the R pixel $20_{-1}$. Then, at time $t_1$, when the reading is started, a reset signal RRST at the time of reading is in the active state.

For the shutter and the reading, the shutter is released within one horizontal synchronization period, and the reading is performed within one horizontal synchronization period. For example, in a case where the shutter is released in a predetermined horizontal synchronization period and the reading is performed in a horizontal synchronization period after the predetermined horizontal synchronization period, the exposure time is equivalent to one horizontal synchronization period. Furthermore, for example, in a case where the shutter is released in a predetermined horizontal synchronization period and the reading is performed in a horizontal synchronization period two periods after the predetermined horizontal synchronization period, the exposure time is equivalent to two horizontal synchronization period.

That is, in a case where the timing at which the shutter is released and the timing at which the reading is started are fixed within the horizontal synchronization period, the exposure time is an integer multiple of one horizontal synchronization period.

The analog-digital conversion unit 14 performs analog-digital conversion (AD conversion) on the pixel signal output from each pixel 20 of the selected pixel row via the vertical signal line 32, and a period in which the analog-digital conversion is performed is an AD period. Furthermore, here, one AD period is one horizontal synchronization period.

Thus, in a case where the timing at which the shutter is released and the timing at which the reading is started are fixed within the horizontal synchronization period, the exposure time is an integer multiple of one AD period.

As described with reference to the timing chart of FIG. 6, in a case where time $T_1$ of the long-time exposure time, time $T_{12}$ of the medium-time exposure time, and time $T_{13}$ of the short-time exposure time are set and the imaging is performed, these exposure times are each an integer multiple of one AD period. This indicates that in a case where the timing at which the shutter is released and the timing at which the reading is started are fixed within one AD period, time $T_{13}$ of the short-time exposure time is at least one AD period.

When the long-time exposure image, the medium-time exposure image, and the short-time exposure image are synthesized to generate an image with a high dynamic range, for example, when a bright place is imaged, a synthesis ratio of the short-time exposure image is set high. At this time, in a case where the short-time exposure image itself is not an appropriate exposure image, for example, in a case where the exposure time is longer than the appropriate exposure time, there is a possibility that an image with halation is generated. In such a case, as a result, there is a possibility that an image with an appropriate high dynamic range cannot be generated.

As described above, in a case where the timing at which the shutter is released and the timing at which the reading is started are fixed within one AD period, time $T_{13}$ of the short-time exposure is at least one AD period. Therefore, even in a case where time $T_{13}$ of the short-time exposure is longer than an appropriate exposure time, time $T_{13}$ of the short-time exposure is set to a time equivalent to one AD period, and there is a possibility that optimal imaging cannot be performed.

Here, the short-time exposure image has been described as an example. However, also in the image in each of the long-time exposure and the medium-time exposure, similarly, when the exposure time can be set only at an integer multiple of one AD period, there is a possibility that the imaging is not performed with an appropriate exposure time as in the case of the short-time exposure image. Furthermore, in a case where the exposure time can be adjusted only in units of one AD period, only rough setting can be performed in the setting of the long-time exposure, the medium-time exposure, and the short-time exposure, and there is a possibility that the ratio of these exposure times cannot be set to a desired ratio. Since the ratio of the exposure times of the long-time exposure, the medium-time exposure, and the short-time exposure is not a desired ratio, there is a possibility that the image quality of the synthesized image is deteriorated.

[Regarding Fine Shutter]

For the problem that only rough setting can be performed in the setting of the long-time exposure, the medium-time exposure, and the short-time exposure, there is the technology of a so-called fine shutter without restriction on the exposure time, which is disclosed in Patent Document 1, as an electronic shutter capable of more finely adjusting an exposure time and setting an appropriate exposure time. The fine shutter will be described below.

Figure 7:
FIG. 7 is a timing chart illustrating a timing relationship among signals for driving a pixel.

Here, as illustrated in FIG. 7, the transfer signal STRG at the time of an electronic shutter and a reset signal RRST at the time of an electronic shutter are output at desired timing within one horizontal synchronization period. In FIG. 7, a plurality of clocks is illustrated to indicate that the clocks can be output at arbitrary timing within one horizontal synchronization period. One of a plurality of these clocks is used as the transfer signal STRG at the time of an electronic shutter or a reset signal RRST at the time of an electronic shutter.

In this way, the timing of releasing the shutter (that is, the shutter operation is performed) can be adjusted at a desired timing in units of one clock within one horizontal synchronization period. Since the timing of releasing the shutter is the timing of starting the exposure, the exposure time can be adjusted in units of one clock within one horizontal synchronization period. In the following description, the description of "releasing the shutter" can be read as "starting the exposure".

As an example, it is considered that one AD period that is one horizontal synchronization period is eight microseconds, one clock is set to 0.02 microseconds, and the timing at which the shutter is released (that is, the timing at which the exposure is started) and the timing at which the reading is started are fixed within the AD period. In this case, in a case where the exposure time is adjusted in units of eight microseconds, the timing at which the shutter is released is variable, and the timing at which the reading is started is fixed within the horizontal synchronization period, the exposure time can be adjusted in units of 0.02 microseconds.

Therefore, in the case of this example, the exposure time can be adjusted with 400 times (=8/0.02) accuracy. When the cycle of one clock is finely set (when a frequency is increased), the exposure time can be more finely adjusted. Note that the frequency of this clock is only required to be set to a numerical value suitable for the accuracy required for the CMOS image sensor 1.

(Circuit Configuration Example)

Figure 8:
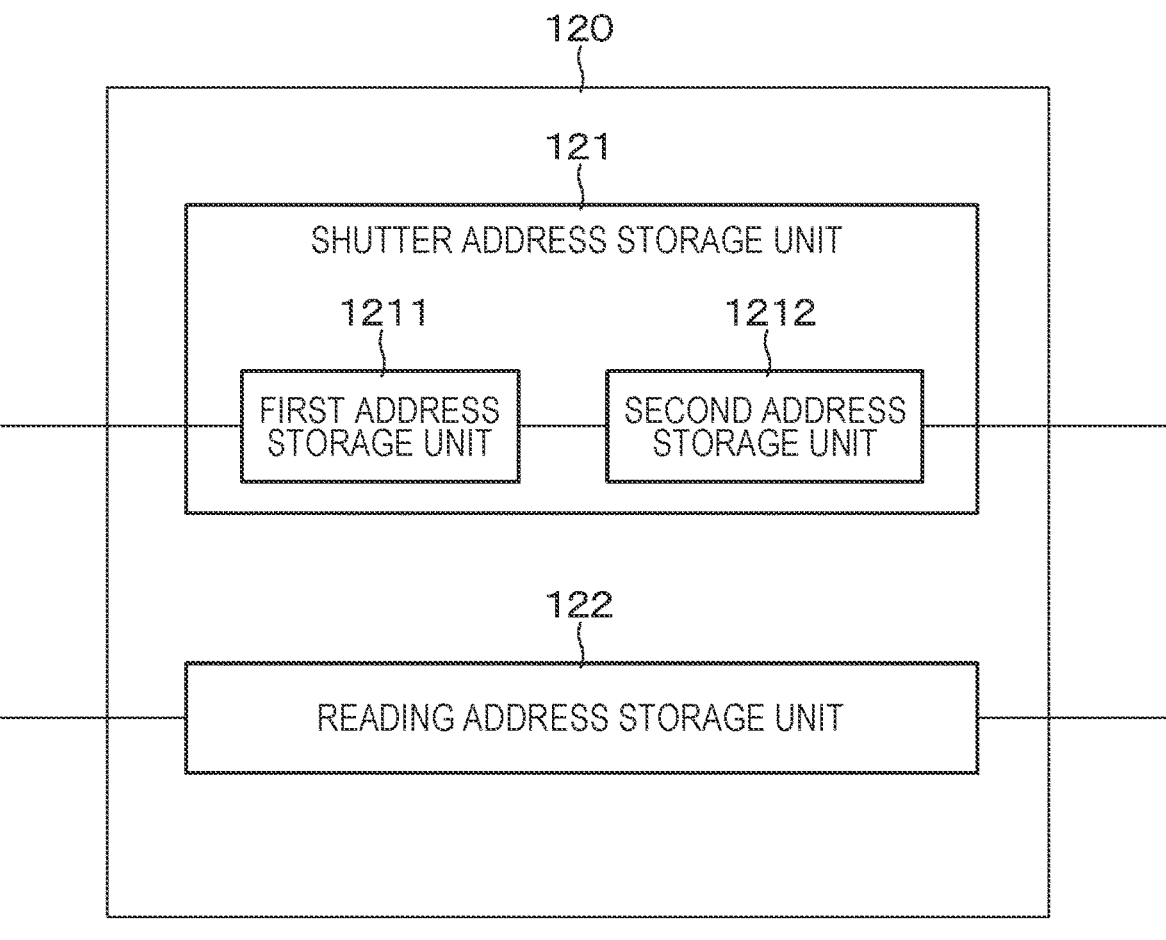
FIG. 8 is a block diagram schematically illustrating a circuit configuration example for controlling a timing of a fine shutter.

Next, a circuit configuration for controlling the timing of the fine shutter will be described. For example, when the row selection unit 12 includes an address decoder, the circuit portion for controlling the fine shutter timing can be configured by the address decoder. An example of the circuit configuration for controlling the fine shutter timing is schematically illustrated in FIG. 8.

An address decoder 120 constituting the row selection unit 12 includes a shutter address storage unit 121 and a reading address storage unit 122 for each pixel row (line) of the pixel array unit 11.

The shutter address storage unit 121 stores an address of a pixel for releasing the shutter. The reading address storage unit 122 stores an address of a pixel to be read. The shutter address storage unit 121 includes a first address storage unit 1211 and a second storage unit 1212.

The address stored in the first address storage unit 1211 is transferred to and stored in the second storage unit 1212 at a predetermined timing. When the address stored in the second storage unit 1212 is supplied to a pixel timing drive unit (not illustrated) at a subsequent stage of the address decoder 120, the shutter operation of the pixel 20 specified by the address is performed.

In this manner, the address (hereinafter, it may be appropriately described as "shutter address") of the fine shutter is managed by two stages of the address storage units (1211, 1212). As described above, the shutter operation of the fine shutter can be executed at a desired timing within one AD period which is one horizontal synchronization period.

Figure 9A:
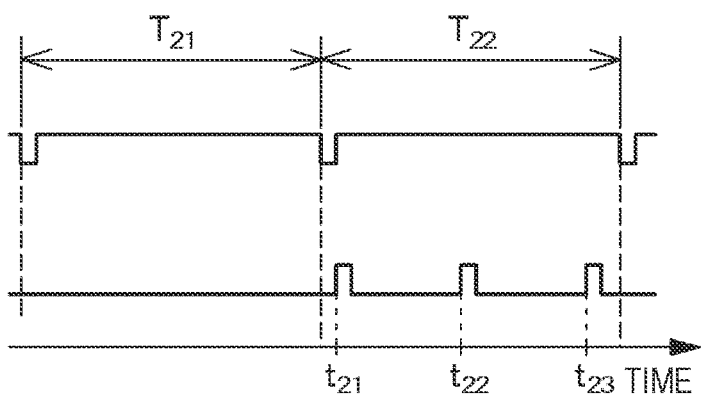
FIG. 9A is a timing chart (part 1) for explaining a timing of a fine shutter.

The description that the shutter operation of the fine shutter can be executed at a desired timing within one AD period will be made again with reference to the timing chart of FIG. 9A. The timing chart of FIG. 9A illustrates a timing relationship between the horizontal synchronization signal and the transfer signal at the time of an electronic shutter. A transfer pulse at the time of an electronic shutter is illustrated for description of the timing of releasing the shutter.

According to the technology of the present fine shutter, it is possible to perform control for releasing the shutter at any timing of time $t_{21}$, time $t_{22}$, or time $t_{23}$ in the AD period. In other words, the shutter can be controlled to be released at any timing of a time point at which the AD period (horizontal synchronization period) is started, an intermediate time point, or a final time point.

Here, a case where the shutter is released at time $t_{21}$ of the AD period $T_{22}$, that is, at a time point at which the AD period $T_{22}$ is started is considered. In a case where the shutter is released at the time point at which the AD period $T_{22}$ is started, it is necessary to specify (decode) the address of the pixel 20 for which the shutter is released at a time point before the shutter is released.

In the example illustrated in the timing chart of FIG. 9A, it is necessary to decode the shutter address in the AD period $T_{21}$ and to release the shutter by using the decoded shutter address in the AD period $T_{22}$.

Figure 9B:
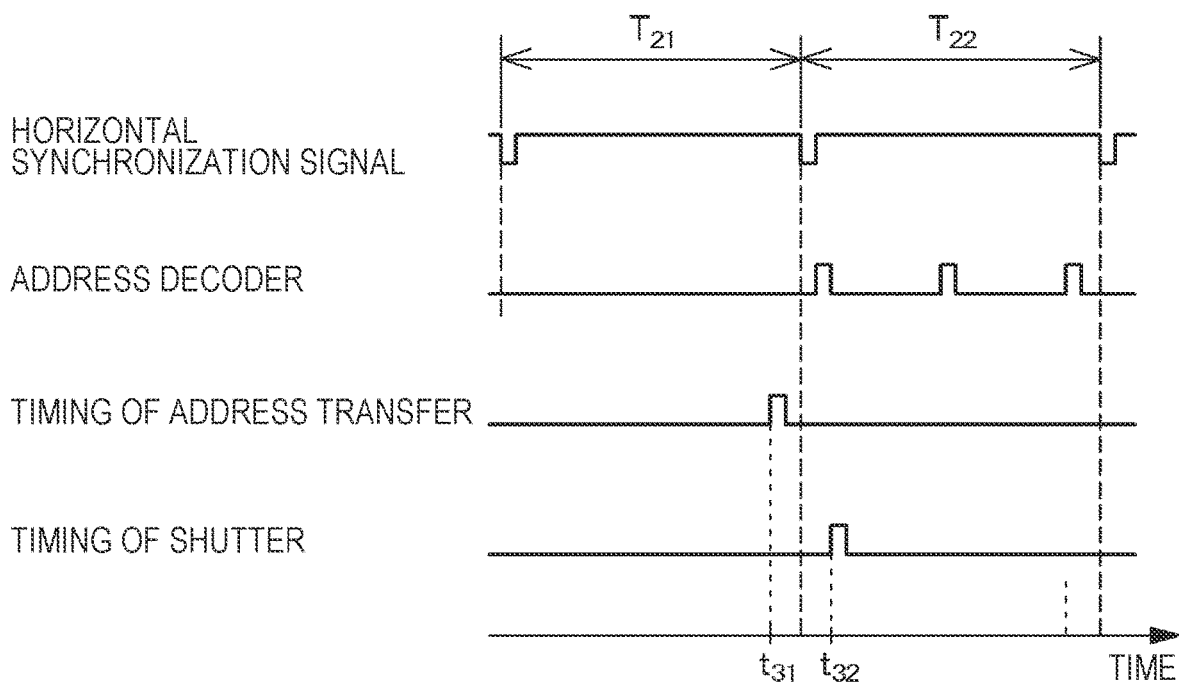
FIG. 9B is a timing chart (part 2) for explaining a timing of a fine shutter.

The description will be further continued with reference to FIG. 9B. During the AD period $T_{21}$, the shutter address of the pixel 20 for which the shutter is released, specifically, the shutter address of the photodiode 21 in the pixel 20 is decoded in a period based on a pulse to be described later, and is stored in the first address storage unit 1211 of the shutter address storage unit 121.

The shutter address stored in the first address storage unit 1211 is transferred from the first address storage unit 1211 to the second address storage unit 1212 on the basis of a pulse instructing transfer of the shutter address from the first address storage unit 1211 to the second address storage unit 1212.

The shutter address decoded in the AD period $T_{21}$ is transferred from the first address storage unit 1211 to the second address storage unit 1212 at a time point $t_{31}$ before the AD period $T_{22}$ in the AD period $T_{21}$, and is stored in the second address storage unit 1212. Then, in the AD period $T_{22}$, the shutter at a time point $t_{32}$ is released on the basis of the shutter address stored in the second address storage unit 1212.

As described above, by setting the AD period $T_{21}$ in which the shutter address is decoded and the AD period $T_{22}$ in which the shutter is released on the basis of the shutter address to different AD periods, the shutter can be released at a desired timing of the AD period. The shutter can be released even when the desired timing is, for example, an early timing within the AD period.

Here, the case where the AD period $T_{21}$ in which the shutter address is decoded and the AD period $T_{22}$ in which the shutter is released on the basis of the shutter address are set to different AD periods has been described as an example. However, for example, in a case where the timing of releasing the shutter is a later timing within the AD period, the AD period in which the decoded address is transferred to the second address storage unit 1212 and the AD period in which the shutter is released on the basis of the shutter address may be the same AD periods.

That is, the timing at which the shutter address is transferred from the first address storage unit 1211 to the second address storage unit 1212 may not be always the same timing but may be a different timing depending on which timing in the AD period the shutter is released at. For example, as described above, in a case where the shutter is released at an early timing within the AD period, the shutter address may be transferred in the AD period before the shutter is released, and in a case where the shutter is released at a later timing within the AD period, the shutter address may be transferred in the same AD period as the AD period in which the shutter is released.

Figure 10:
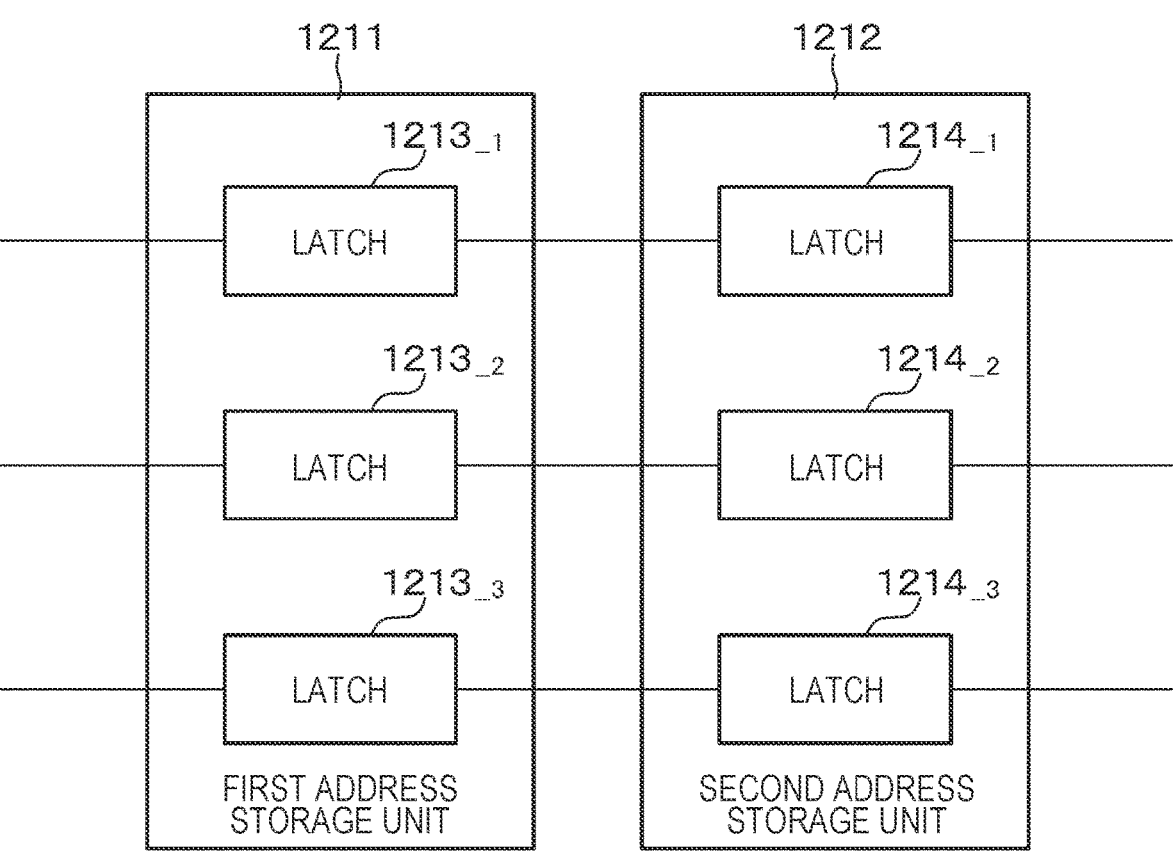
FIG. 10 is a block diagram schematically illustrating an internal configuration example of a shutter address storage unit.

For example, the first address storage unit 1211 and the second address storage unit 1212 can be configured by latches. In a case where each of the first address storage unit 1211 and the second address storage unit 1212 includes latches, the latches are 3-bit latches as illustrated in FIG. 10.

In the present embodiment, since three exposure of the long-time exposure, the medium-time exposure, and the short-time exposure are controlled, a 3-bit latch configuration is used to store the address in each exposure. In the example illustrated in FIG. 10, the first address storage unit 1211 includes a latch $1213_{-1}$, a latch $1213_{-2}$, and a latch $1213_{-3}$. The second address storage unit 1212 includes a latch $1214_{-1}$, a latch $1214_{-2}$, and a latch $1214_{-3}$.

For example, the latch $1213_{-1}$ and the latch $1214_{-1}$ can be configured to store a shutter address for long-time exposure, the latch $1213_{-2}$ and the latch $1214_{-2}$ can be configured to store a shutter address for medium-time exposure, and the latch $1213_{-3}$ and the latch $1214_{-3}$ can be configured to store a shutter address for short-time exposure.

The internal configuration of the shutter address storage unit 121 described above is an example, and is not limited to this configuration. For example, the first address storage unit 1211 and the second address storage unit 1212 may be configured by components other than the latches. Furthermore, here, in order to control three exposure of the long-time exposure, the medium-time exposure, and the short-time exposure, the 3-bit latch configuration for storing the address in each exposure has been described as an example. However, for example, in a case where two exposure of the long-time exposure and the short-time exposure are controlled, a 2-bit latch configuration can be used.

According to the fine shutter function described above, since the shutter can be released at a desired timing within one AD period (one horizontal synchronization period), in other words, the exposure can be started, the shutter operation without restriction on the exposure time can be performed. As described above, the exposure can be started at a desired timing within one AD period, that is, the exposure time is not limited, and thus the exposure time can be more finely adjusted. Then, since the exposure time can be more finely adjusted, imaging can be performed with an appropriate exposure time. Therefore, the image quality of the captured image can be improved.

As an example, since a plurality of images having different exposure times, for example, a long-time exposure image having a relatively long exposure time and a short-time exposure image having a relatively short exposure time are continuously and individually captured, the long-time exposure image is used for a dark image region, and the short-time exposure image is used for a bright image region in which halation occurs in the long-time exposure image, a high dynamic range image without halation can be obtained. In such a case, by using the fine shutter function without restriction on the exposure time, the exposure time at the time of capturing the long-time exposure image and the exposure time at the time of capturing the short-time exposure image can be appropriately adjusted individually.

[Regarding Problem of Shading Peculiar to Fine Shutter]

In the case of the fine shutter without restriction on the exposure time described above, a problem of shading peculiar to the fine shutter may occur. The problem of shading peculiar to the fine shutter will be described using the current pixel layout configuration illustrated in FIG. 11. Note that, in FIG. 11, two photodiodes $21_{-1}$ and $21_{-2}$ are referred to as "PD", two transfer transistors $22_{-1}$ and $22_{-2}$ are referred to as "TGR Tr.", the reset transistor 23 is referred to as "RST Tr.", the amplification transistor 24 is referred to as "AMP Tr.", and the selection transistor 25 is referred to as "SEL Tr.".

Figure 11:
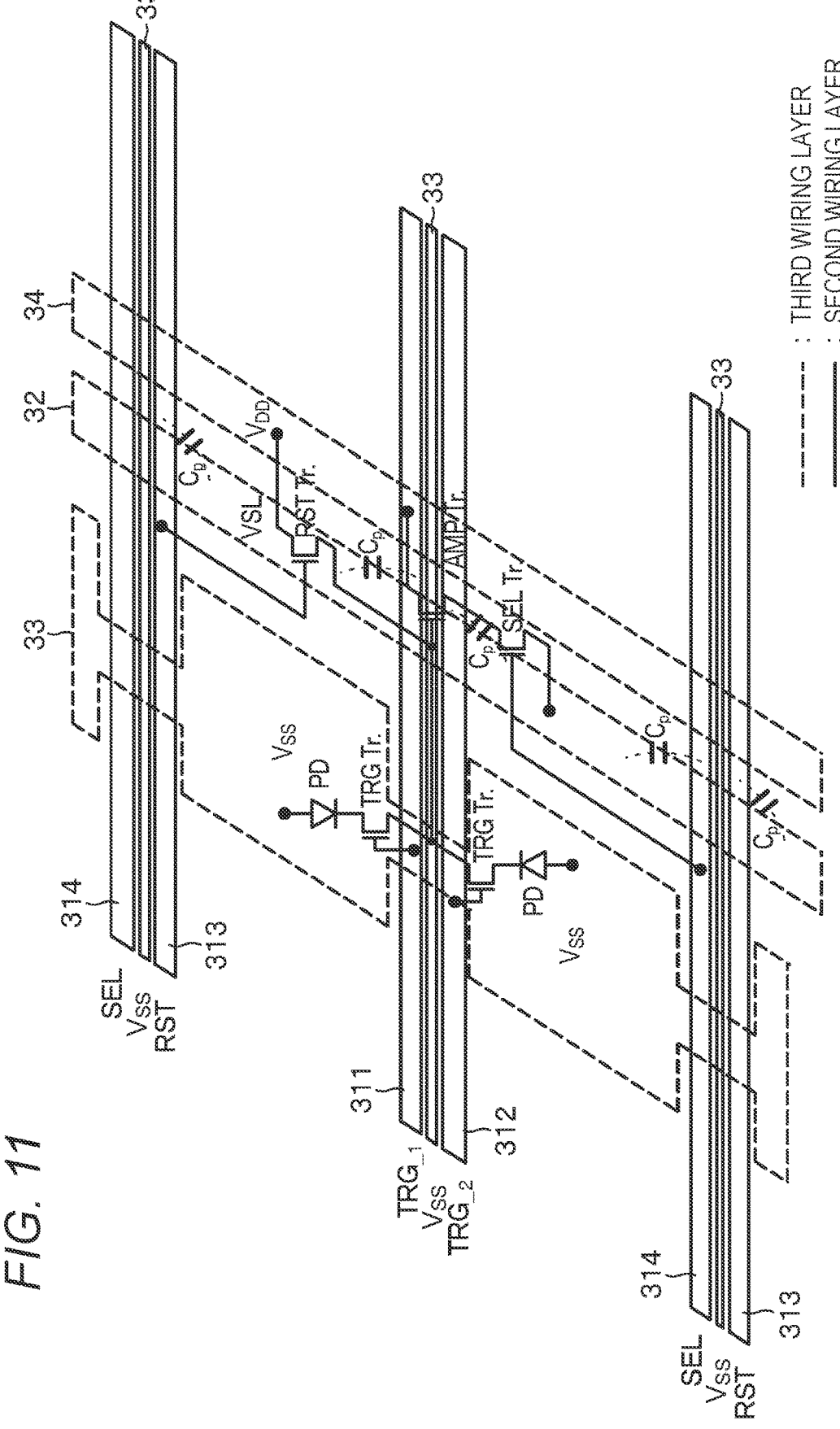
FIG. 11 is a schematic diagram illustrating a current pixel layout configuration.

As illustrated in FIG. 11, the power supply line 33 (hereinafter, referred to as "power supply line 33 of $V_{SS}$") of a low-potential-side power supply voltage $V_{SS}$ is wired in a second wiring layer (Illustrated by a solid line in the drawing) in a state in which the power supply line 33 is disposed in parallel with respect to the pixel control line 31, that is, the transfer control line 311, the transfer control line 312, the reset control line 313, and the selection control line 314. Furthermore, the vertical signal line 32 is wired in a third wiring layer (illustrated by a broken line in the drawing) in a state in which the vertical signal line 32 is orthogonal to the transfer control line 311, the transfer control line 312, the reset control line 313, and the selection control line 314.

In this pixel layout configuration, a parasitic capacitance $C_p$ exists between the $V_{SS}$ power supply line 33 and the transfer control line 311, the transfer control line 312, the reset control line 313, and the selection control line 314. Then, at the time of fine shutter, the potential of the power supply line 33 may varies due to coupling with the $V_{SS}$ power supply line 33. Furthermore, at the time of the fine shutter, the potential of the floating diffusion FD may vary due to the parasitic capacitance between the $V_{SS}$ power supply line 33 and the floating diffusion FD.

As described above, it is conceivable that shading in the horizontal direction or a vertical streak is generated due to a variation in $V_{SS}$ power supply line 33 or a variation in potential of the floating diffusion FD. In the present specification, the shading in the horizontal direction and the vertical streak are collectively referred to as "shading problems peculiar to the fine shutter" for convenience.

EMBODIMENT OF PRESENT DISCLOSURE

In an embodiment of the present disclosure, in the CMOS image sensor 1 having a shutter function (that is, the fine shutter function) capable of performing a shutter operation at a desired timing within one horizontal synchronization period, a problem of shading peculiar to the fine shutter is solved, and occurrence of shading in any input image can be suppressed at any shutter timing. Specifically, in the embodiment of the present disclosure, by adopting a pixel layout configuration in which the vertical signal line 32 is shielded by the $V_{SS}$ power supply line 33, shading correction is executed regardless of the input image, and occurrence of shading peculiar to the fine shutter is suppressed.

As described above, by performing shading correction not depending on the input image and suppressing the occurrence of shading peculiar to the fine shutter, the exposure time can be more finely adjusted by using the fine shutter function without restriction on the exposure time. For example, in the CMOS image sensor 1 having a function of capturing a plurality of images at different exposure times and synthesizing a plurality of these images to generate an image with a high dynamic range, the exposure times at the time of capturing a plurality of images with different exposure times can be appropriately adjusted, and thus a high-quality captured image can be obtained.

Hereinafter, a specific example of a pixel layout configuration capable of suppressing the occurrence of shading peculiar to the fine shutter will be described.

First Example

Figure 12:
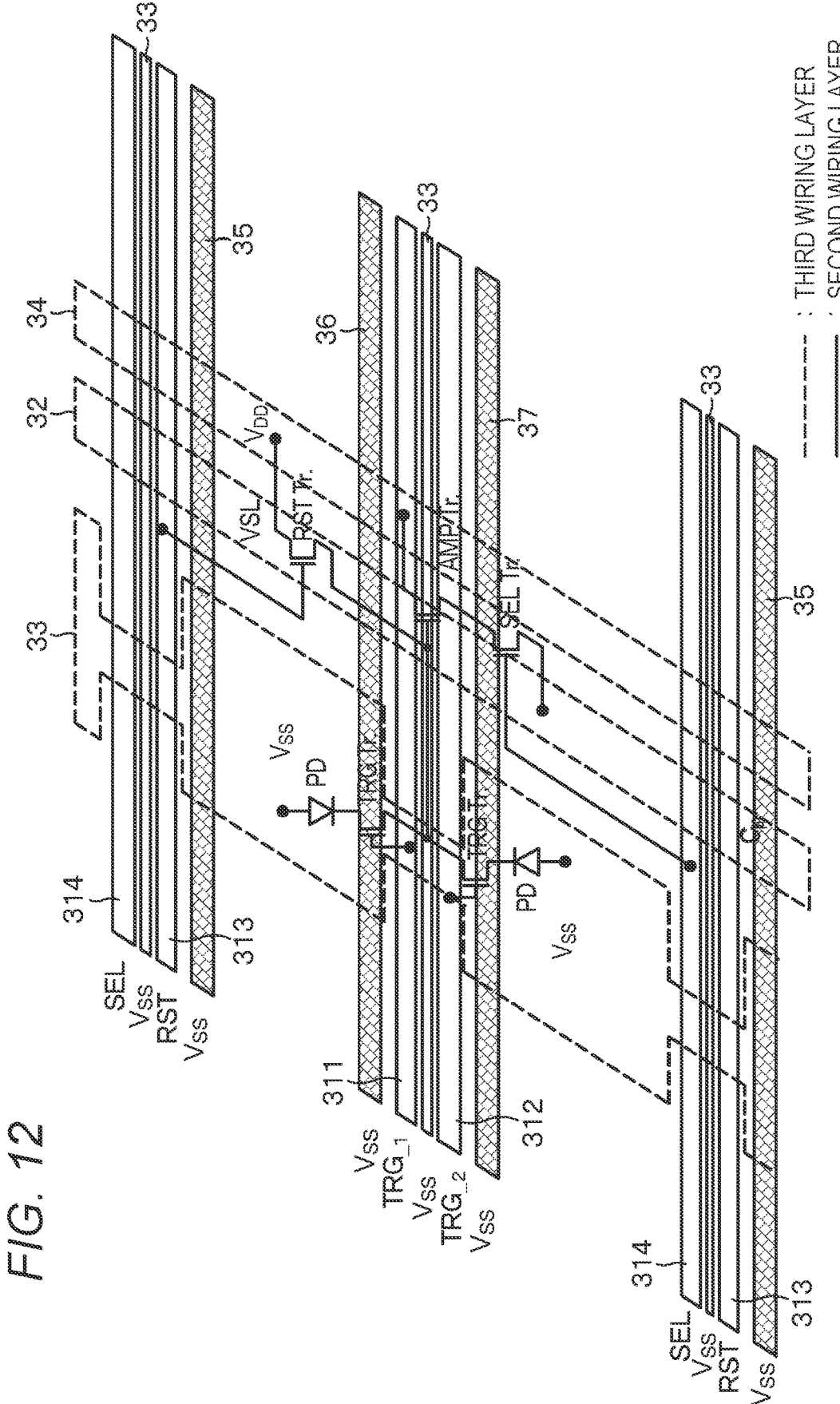
FIG. 12 is a schematic diagram illustrating a pixel layout configuration according to a first example.

The first example is an example in which the pixel control line 31 is shielded by a $V_{SS}$ power supply line additionally wired to the second wiring layer. FIG. 12 is a schematic diagram illustrating a pixel layout configuration according to the first example.

As illustrated in FIG. 12, the $V_{SS}$ power supply line 33 is wired in a second wiring layer (Illustrated by a solid line in the drawing) in a state in which the $V_{SS}$ power supply line 33 is disposed in parallel with respect to the pixel control line 31, that is, the transfer control line 311, the transfer control line 312, the reset control line 313, and the selection control line 314. Furthermore, the vertical signal line 32 and the power supply line 34 of the high-potential-side power supply voltage $V_{DD}$ (hereinafter, it is described as "$V_{DD}$ power supply line 34") are wired in the third wiring layer (Illustrated by a broken line in the drawing) in a state in which the power supply line 34 is orthogonal to the pixel control line 31 (311 to 314).

Note that, in FIG. 12, two photodiodes $21_{-1}$ and $21_{-2}$ are referred to as "PD", two transfer transistors $22_{-1}$ and $22_{-2}$ are referred to as "TGR Tr.", the reset transistor 23 is referred to as "RST Tr.", the amplification transistor 24 is referred to as "AMP Tr.", and the selection transistor 25 is referred to as "SEL Tr.". The same is applied to examples to be described later. Furthermore, the pixel control lines 31 (311 to 314) is wired in the second wiring layer (Illustrated by a solid line in the drawing), and the vertical signal lines 32 and the $V_{DD}$ power supply line 34 are wired in the third wiring layer (Illustrated by a broken line in the drawing) in the same manner in the examples to be described later.

In the pixel layout configuration according to the first example, in the second wiring layer, a shielding $V_{SS}$ power supply line 35 is additionally wired on the opposite side of the $V_{SS}$ power supply line 33 across the reset control line 313 disposed in parallel with the existing $V_{SS}$ power supply line 33. With this pixel layout configuration, the reset control line 313 is shielded by the existing $V_{SS}$ power supply line 33 and the shielding $V_{SS}$ power supply line 35.

Moreover, in the second wiring layer, with respect to the transfer control line 311 and the transfer control line 312 which are parallel with the existing $V_{SS}$ power supply line 33 interposed therebetween, a shielding $V_{SS}$ power supply line 36 and a shielding $V_{SS}$ power supply line 37 are additionally wired so as to interpose the transfer control line 311 and the transfer control line 312. With this pixel layout configuration, the transfer control line 311 is shielded by the existing $V_{SS}$ power supply line 33 and the shielding $V_{SS}$ power line 36, and the transfer control line 312 is shielded by the existing $V_{SS}$ power supply line 33 and the shielding $V_{SS}$ power supply line 37.

In the pixel layout configuration according to the first example having the above-described configuration, the reset control line 313 is shielded by the existing $V_{SS}$ power supply line 33 and the shielding $V_{SS}$ power supply line 35, the transfer control line 311 is shielded by the existing $V_{SS}$ power supply line 33 and the shielding $V_{SS}$ power supply line 36, and the transfer control line 312 is shielded by the existing $V_{SS}$ power supply line 33 and the shielding $V_{SS}$ power supply line 37. Therefore, it is possible to reduce the influence on the vertical signal line 32 from the transfer control line 311, the transfer control line 312, and the reset control line 313, and thus, it is possible to suppress the occurrence of shading peculiar to the fine shutter.

Second Example

Figure 13:
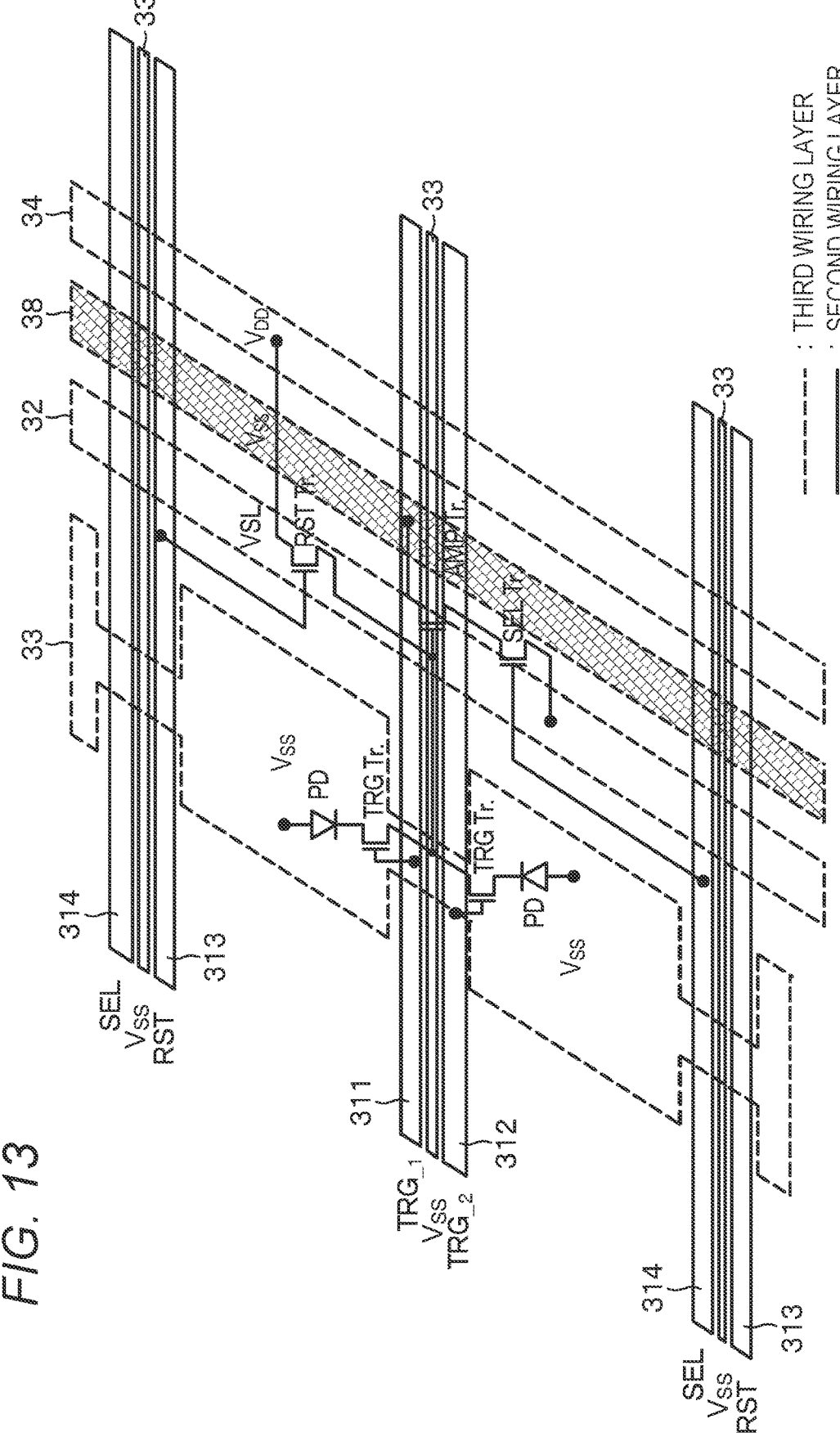
FIG. 13 is a schematic diagram illustrating a pixel layout configuration according to a second example.

The second example is an example in which a $V_{SS}$ power supply line is additionally wired in the third wiring layer, and the vertical signal line 32 is shielded by the $V_{SS}$ power supply line. FIG. 13 is a schematic diagram illustrating a pixel layout configuration according to the second example.

In the pixel layout configuration according to the second example, in the third wiring layer (illustrated by a broken line in the drawing), a shielding $V_{SS}$ power supply line 38 is additionally wired in a state of being parallel with the vertical signal line 32, and the vertical signal line 32 is shielded by the shielding $V_{SS}$ power supply line 38. More specifically, the shielding $V_{SS}$ power supply line 38 is additionally wired between the vertical signal line 32 and the $V_{DD}$ power supply line 34.

In the pixel layout configuration according to the second example having the above-described configuration, in the third wiring layer, the shielding $V_{SS}$ power supply line 38 is additionally wired, and the vertical signal line 32 is shielded by the shielding $V_{SS}$ power supply line 38. Therefore, it is possible to reduce the influence on the vertical signal line 32 from the pixel control line 31 (311 to 314) and the $V_{DD}$ power supply line 34, and thus it is possible to suppress the occurrence of shading peculiar to the fine shutter.

Third Example

Figure 14:
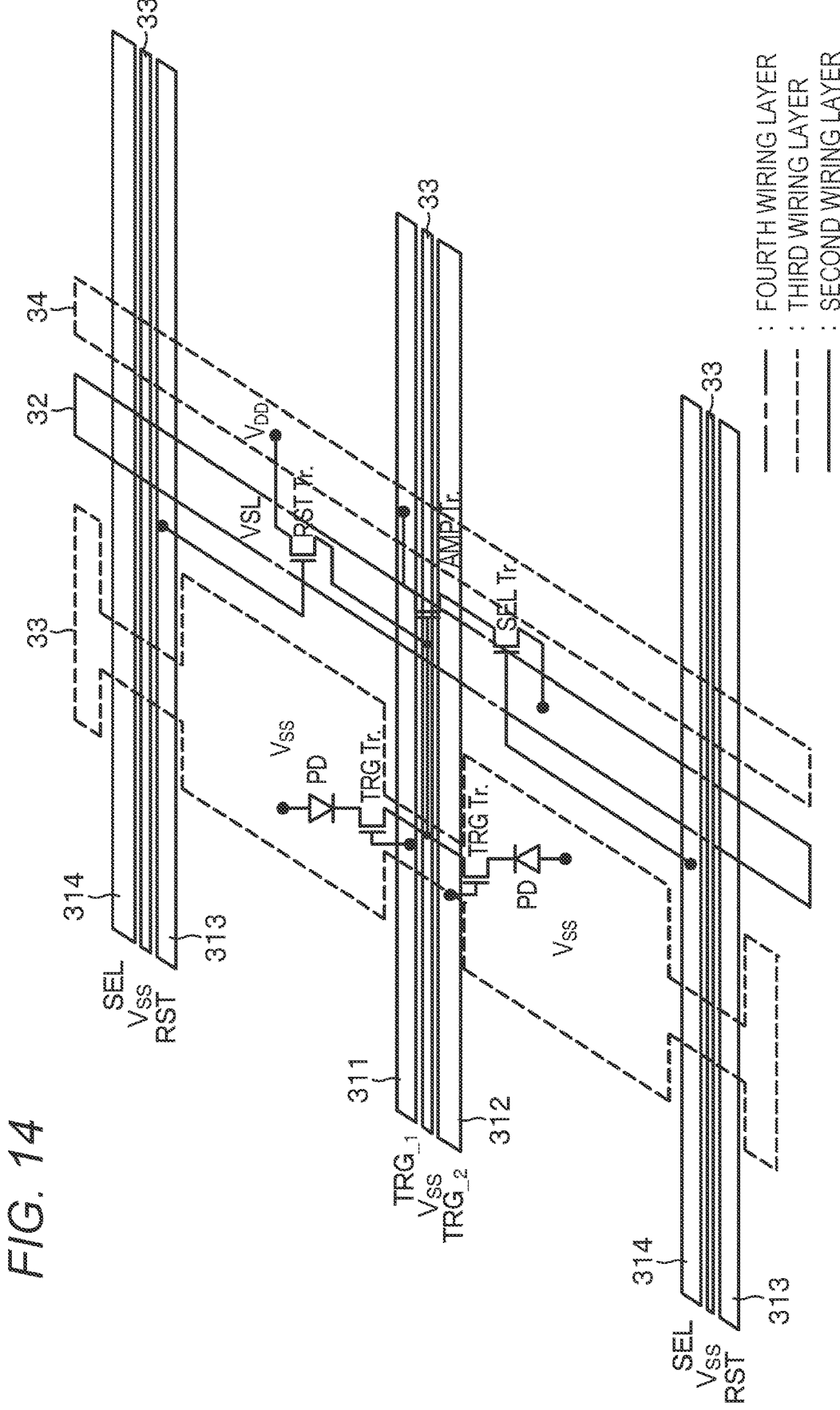
FIG. 14 is a schematic diagram illustrating a pixel layout configuration according to a third example.

The third example is an example in which one wiring layer of the vertical signal line 32 is added on the third wiring layer to be a fourth wiring layer. FIG. 14 is a schematic diagram illustrating a pixel layout configuration according to the third example.

In the pixel layout configuration according to the third example, one wiring layer of the vertical signal line 32 is added on the third wiring layer and wired as the fourth wiring layer (illustrated by a one-dot chain line in the drawing). Therefore, a distance between the vertical signal line 32 and the pixel control line 31 (311 to 314) can be increased as compared with the case where the vertical signal line 32 is wired in the third wiring layer.

In the pixel layout configuration according to the third example having the above-described configuration, it is possible to reduce the influence of the potential variation of the $V_{SS}$ power supply line 33 due to coupling at the time of the fine shutter on the vertical signal line 32 by increasing the distance between the vertical signal line 32 and the pixel control line 31 (311 to 314), and thus it is possible to suppress the occurrence of shading peculiar to fine shutter.

Fourth Example

Figure 15:
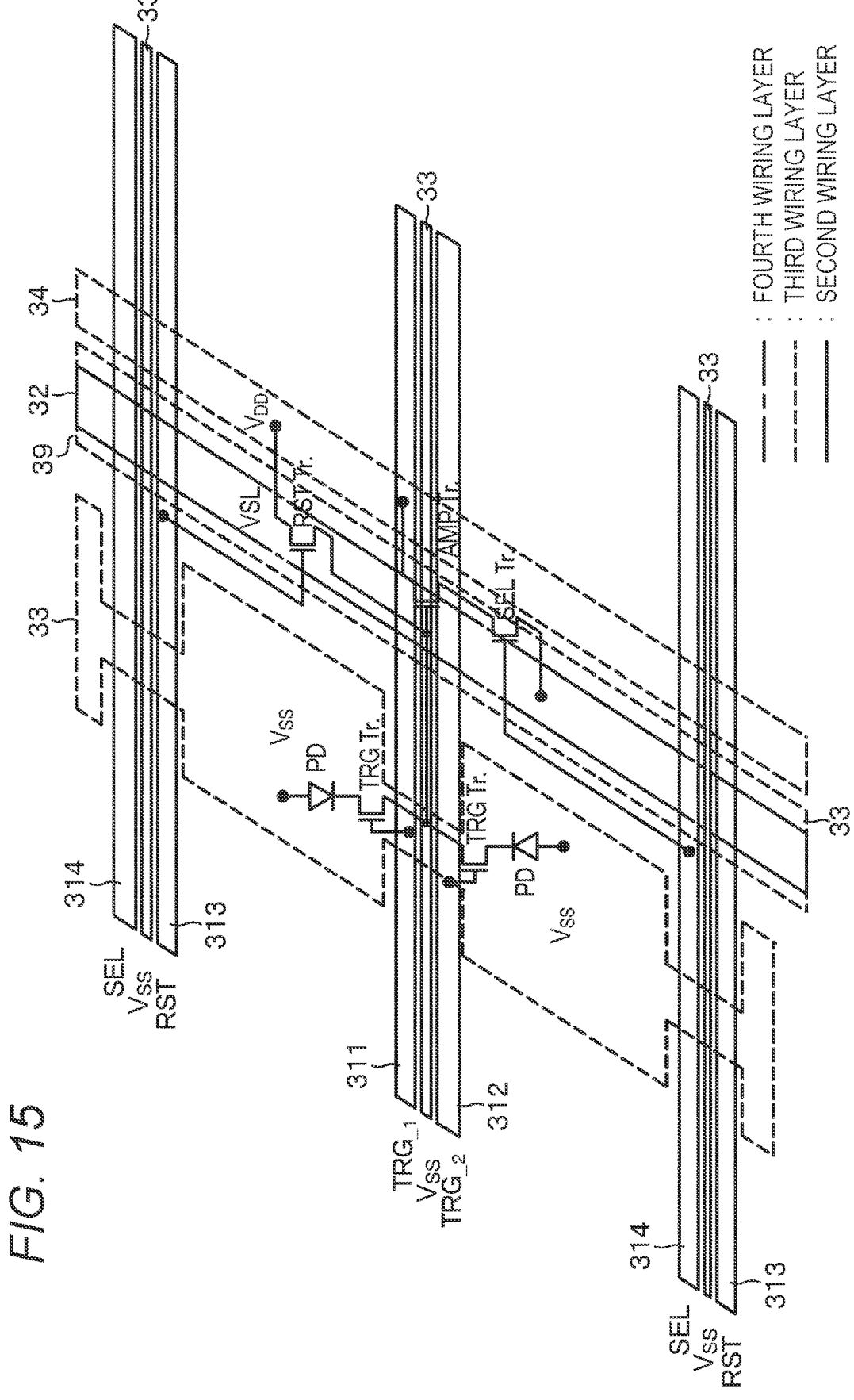
FIG. 15 is a schematic diagram illustrating a pixel layout configuration according to a fourth example.

The fourth example is a modification example of the third example, and is an example in which a $V_{SS}$ power supply line is additionally wired in the third wiring layer and shielded so as to be positioned under the vertical signal line 32 of the fourth layer. FIG. 15 is a schematic diagram illustrating a pixel layout configuration according to the fourth example.

In the pixel layout configuration according to the fourth example, similarly to the case of the third example, the vertical signal line 32 is wired in the fourth wiring layer (illustrated by a one-dot chain line in the drawing), and then a shielding $V_{SS}$ power supply line 39 is additionally wired in the third wiring layer (illustrated by a broken line in the drawing) so as to be positioned under the vertical signal line 32. Therefore, the vertical signal line 32 is shielded by the shielding $V_{SS}$ power supply line 39.

In the pixel layout configuration according to the fourth example having the above-described configuration, it is possible to further reduce the influence of the potential variation of the $V_{SS}$ power supply line 33 due to coupling at the time of the fine shutter on the vertical signal line 32 by shielding the vertical signal line 32 of the fourth wiring layer with the $V_{SS}$ power supply line 39 of the third shielding wiring layer, and thus it is possible to further suppress the occurrence of shading peculiar to fine shutter.

Modification Example

As described above, the technology according to the present disclosure has been described on the basis of the preferred embodiment, but the technology according to the present disclosure is not limited to the embodiment. The configuration and structure of the imaging device described in the embodiment are examples and can be changed as appropriate. For example, in the above-described embodiment, the circuit configuration in which some circuit elements are shared by a plurality of the pixels (for example, by two pixels) has been described as the circuit configuration of the pixel 20. However, a circuit configuration in which some circuit elements are not shared by a plurality of the pixels, that is, a circuit configuration in which each of the pixels 20 includes the reset transistor 23, the amplification transistor 24, and the selection transistor 25 in addition to the photodiode 21 and the transfer transistor 22 may be adopted.

Application Example

Figure 16:
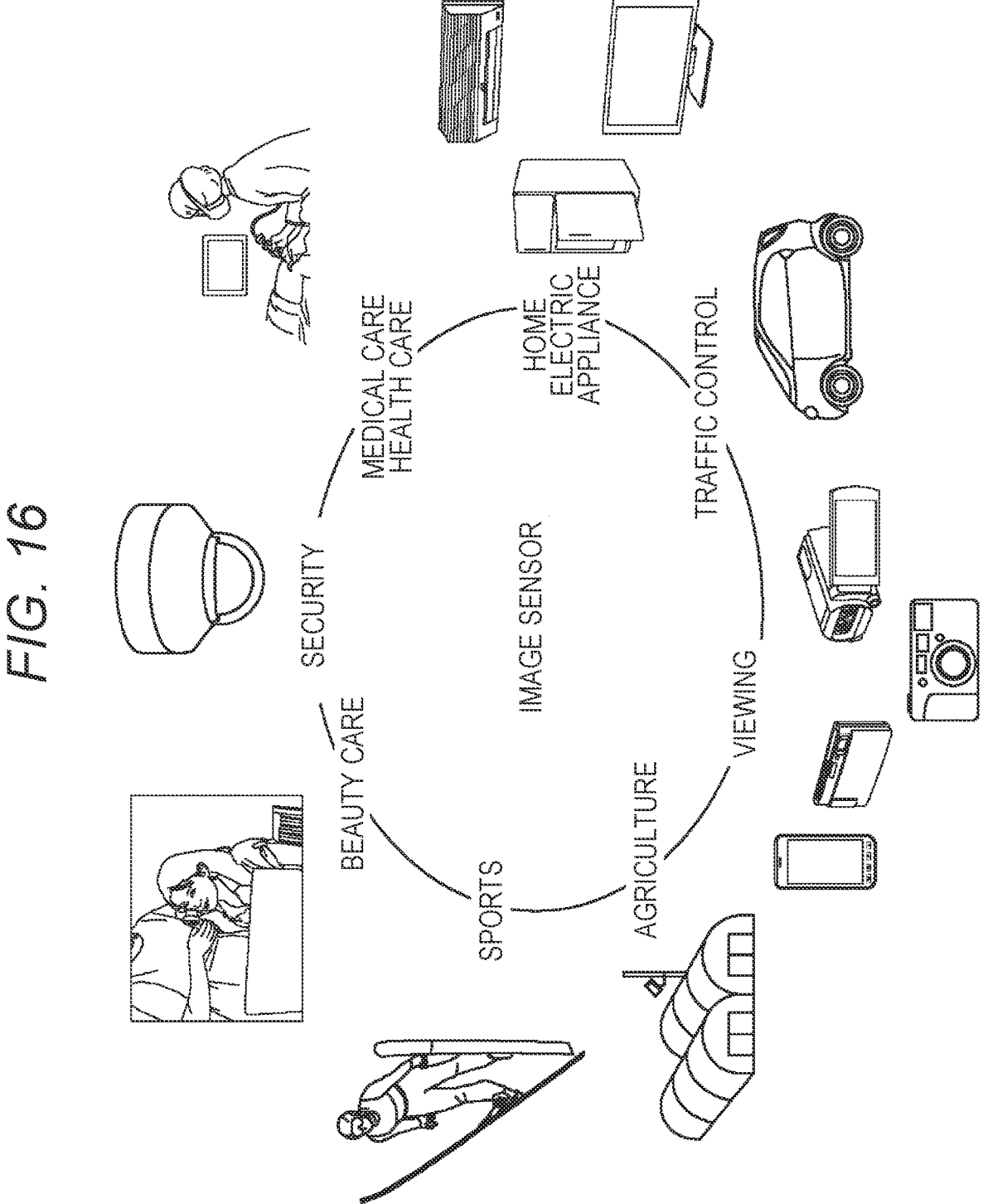
FIG. 16 is a diagram illustrating an application example of the technology according to the present disclosure.

The imaging device of the present disclosure described above can be used, for example, in various devices sensing light such as visible light, infrared light, ultraviolet light, and X-rays as will be illustrated in FIG. 16. Specific examples of various devices are listed below.

A device that captures an image to be used for viewing, such as a digital camera or a portable device with a camera function A device used for traffic control, such as an in-vehicle sensor that captures images of the forward side, rearward side, surrounding, inside of an automobile, a monitoring camera that monitors traveling vehicles and roads, and a distance measuring sensor that measures a distance between vehicles, for safe driving such as automatic stop, recognition of a driver's condition, and the like.

A device used for home electric appliances such as a TV, a refrigerator, and an air conditioner in order to capture an image of a gesture of a user and perform an apparatus operation according to the gesture.

A device used for medical care or health care, such as an endoscope or a device used for performing angiography by receiving infrared light.

A device used for security, such as a monitoring camera for crime prevention or a camera for person authentication.

A device used for beauty care, such as a skin measuring instrument for imaging skin or a microscope for imaging scalp.

A device used for sports, such as an action camera for sports or a wearable camera for sports.

A device used for agriculture, such as a camera for monitoring conditions of fields and crops <Application Example of Technology According to Present Disclosure>

The technology according to the present disclosure can be applied to various products. Hereinafter, a more specific application example will be described.

[Electronic Apparatus of Present Disclosure]

Here, a case where the present disclosure is applied to an imaging system such as a digital still camera or a video camera, a mobile terminal device having an imaging function, such as a mobile phone, or an electronic apparatus such as a copier using an imaging device as an image reading unit will be described.

(Imaging System)

Figure 17:
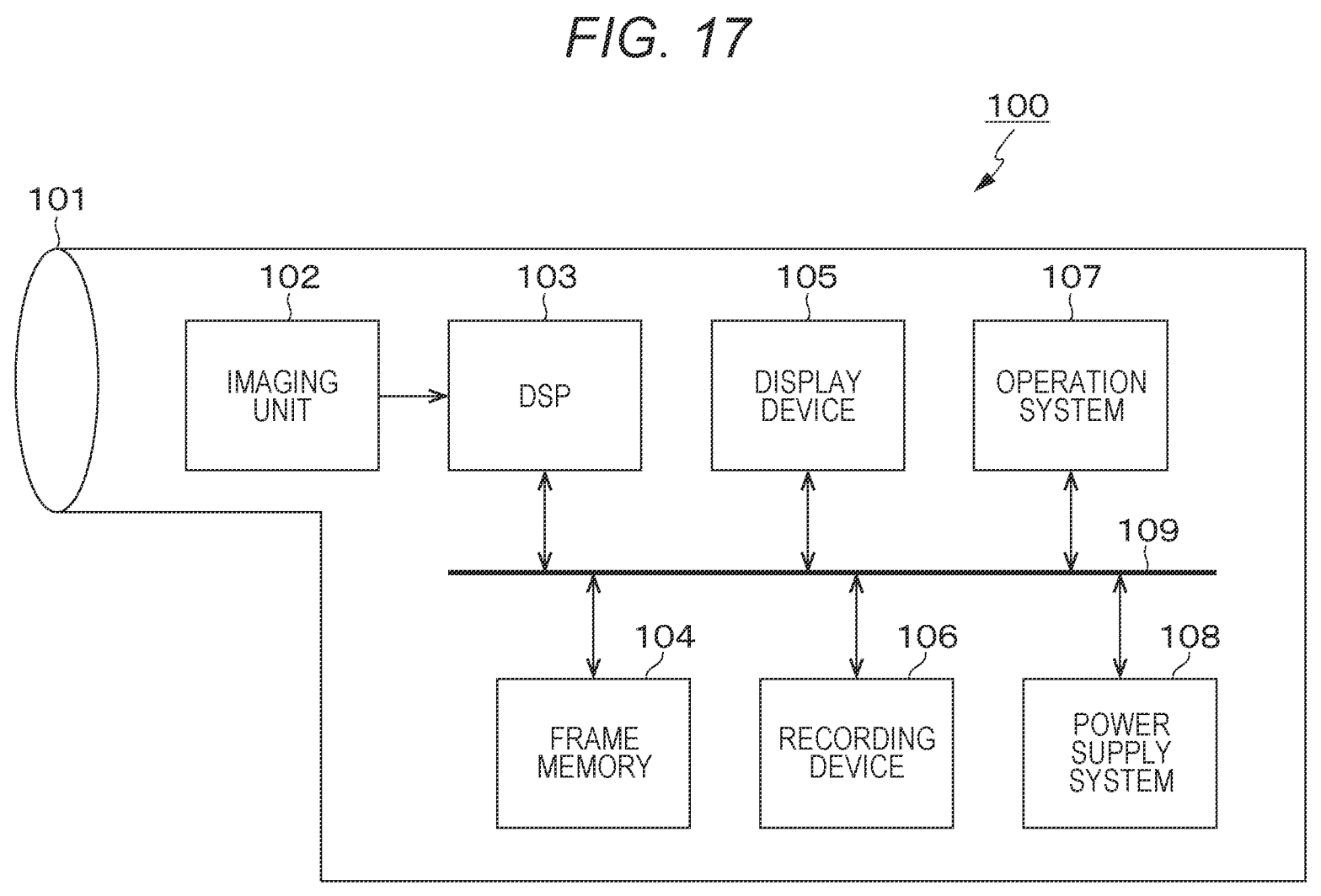

FIG. 17 is a block diagram schematically illustrating a configuration example of the imaging system which is an example of an electronic apparatus of the present disclosure. As illustrated in FIG. 17, an imaging system 100 according to the present example includes an imaging optical system 101 including a lens group, an imaging unit 102, a digital signal processor (DSP) circuit 103, a frame memory 104, a display device 105, a recording device 106, an operation system 107, and a power supply system 108. Then, the DSP circuit 103, the frame memory 104, the display device 105, the recording device 106, the operation system 107, and the power supply system 108 are connected to each other via a bus line 109.

The imaging optical system 101 receives incident light (image light) from a subject and forms an image on an imaging surface of the imaging unit 102. The imaging unit 102 converts the light amount of the incident light captured on the imaging surface by the optical system 101 into an electrical signal for each pixel and outputs the electrical signal as a pixel signal. The DSP circuit 103 performs general camera signal processing, for example, white balance processing, demosaic processing, gamma correction processing, and the like.

The frame memory 104 is appropriately used for storing data in the process of signal processing in the DSP circuit 103. An example of the display device 105 includes a panel-type display device such as a liquid crystal display device or an organic electro luminescence (EL) display device, and displays a moving image or a still image, which is captured by the imaging unit 102. The recording device 106 records the moving image or the still image, which is captured by the imaging unit 102, on a recording medium such as a portable semiconductor memory, an optical disk, or a hard disk drive (HDD).

The operation system 107 issues operation commands for various functions of the imaging device 100 by the operation of a user. The power supply system 108 appropriately supplies various power sources serving as operation power sources for the DSP circuit 103, the frame memory 104, the display device 105, the recording device 106, and the operation system 107 to these supply targets.

In the imaging system 100 having the above-described configuration, the imaging device of the present disclosure can be used as the imaging unit 102. In the imaging device of the present disclosure, when the fine shutter is implemented without restriction on the exposure time, it is possible to suppress the occurrence of shading in any input image at any shutter timing. Therefore, it is possible to obtain a high-quality captured image by using the imaging device of the present disclosure as the imaging unit 102.

[Application Example to Mobile Body]

The technology according to the present disclosure can be applied to various products. For example, the technology according to the present disclosure may be realized as the imaging device mounted on any type of mobile body such as an automobile, an electric vehicle, a hybrid electric vehicle, a motorcycle, a bicycle, a personal mobility, an airplane, a drone, a ship, a robot, a construction machine, or an agricultural machine (tractor).

Figure 18:
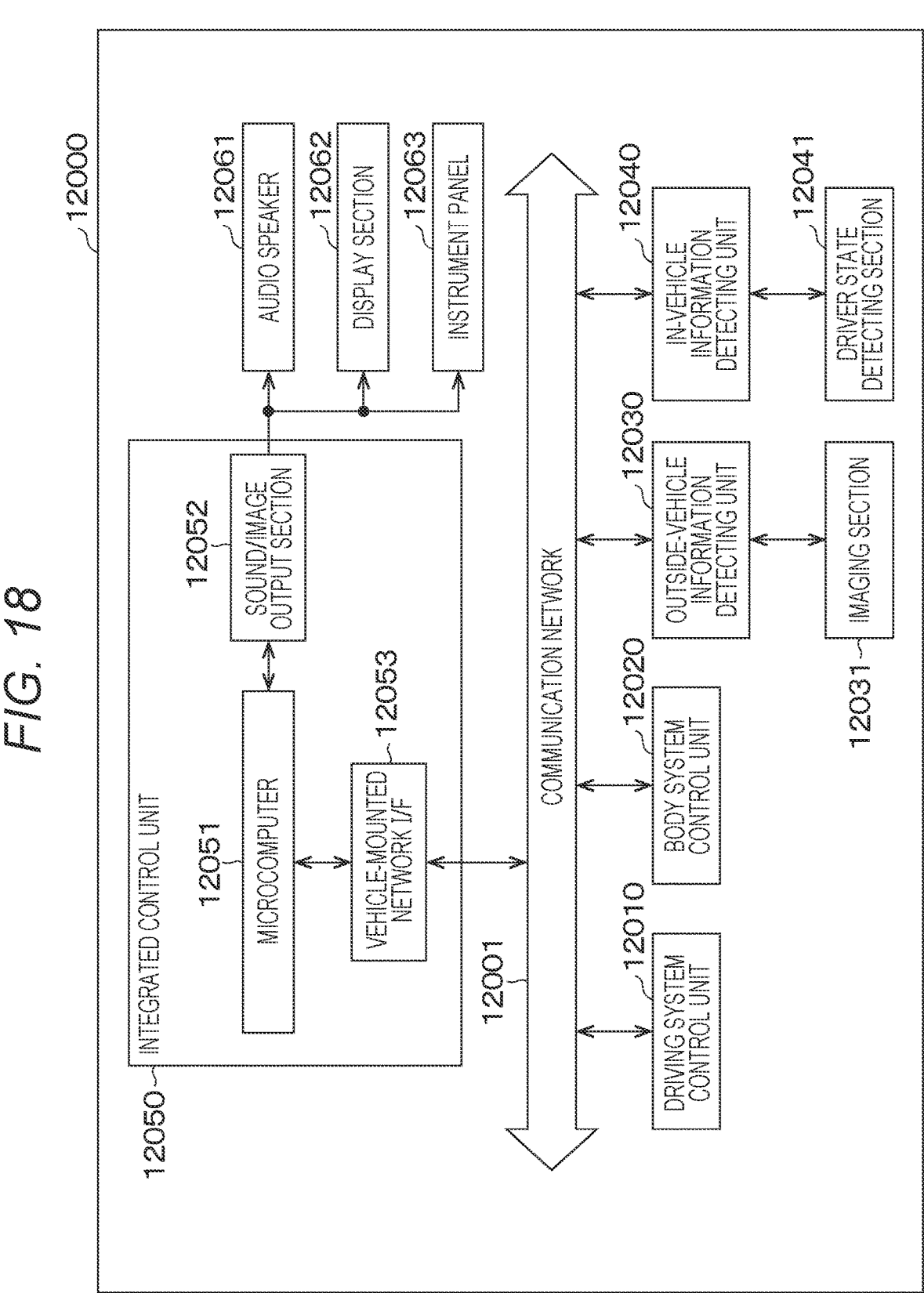
FIG. 18 is a block diagram illustrating a schematic configuration example of a vehicle control system which is an example of a mobile body control system to which the technology according to the present disclosure can be applied.

FIG. 18 is a block diagram depicting an example of schematic configuration of a vehicle control system as an example of a mobile body control system to which the technology according to the present disclosure can be applied.

The vehicle control system 12000 includes a plurality of electronic control units connected to each other via a communication network 12001. In the example depicted in FIG. 1021, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of information regarding the outside of the vehicle, the information obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 18, an audio speaker 12061, a display section 12062, and an instrument panel 12063 are illustrated as the output device. The display section 12062 may, for example, include at least one of an on-board display and a head-up display.

Figure 19:
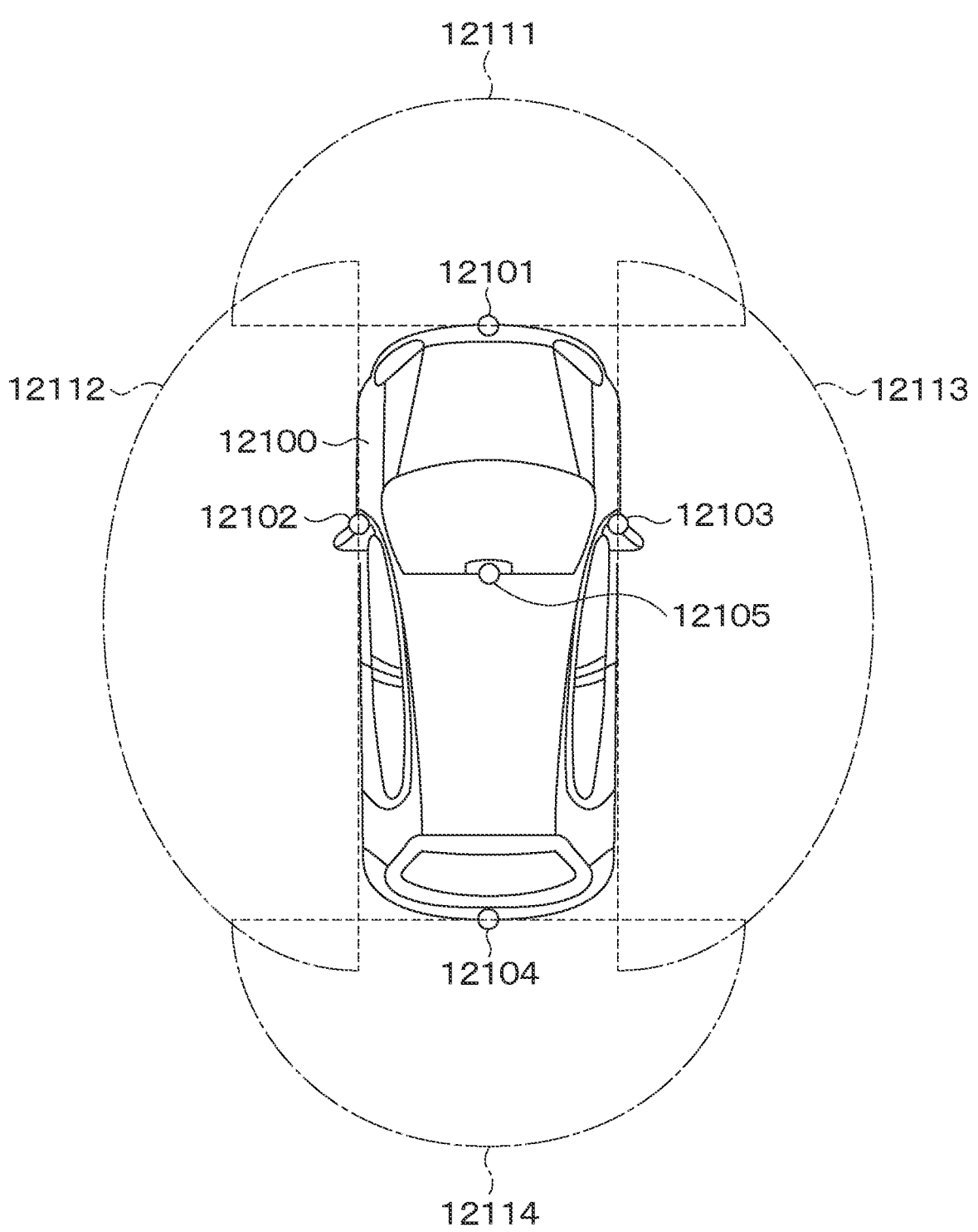
FIG. 19 is a diagram illustrating an example of an installation position of an imaging section in the mobile body control system.

FIG. 19 is a diagram illustrating an example of an installation position of the imaging section 12031.

In FIG. 19, a vehicle 12100 includes, as the imaging section 12031, imaging sections 12101, 12102, 12103, 12104, and 12105.

For example, the imaging sections 12101, 12102, 12103, 12104, and 12105 are provided at positions on a front nose, sideview mirrors, a rear bumper, and a back door of the vehicle 12100 and at a position on an upper portion of a windshield inside the vehicle interior. The imaging section 12101 provided to the front nose and the imaging section 12105 provided to the upper portion of the windshield within the interior of the vehicle obtain mainly an image of the front of the vehicle 12100. The imaging sections 12102 and 12103 provided on the sideview mirrors mainly obtain images of the sideward sides of the vehicle 12100. The imaging section 12104 provided to the rear bumper or the back door obtains mainly an image of the rear of the vehicle 12100. The forward side images obtained by the imaging sections 12101 and 12105 are mainly used to detect a preceding vehicle, a pedestrian, an obstacle, a traffic light, a traffic sign, a lane, or the like.

Note that FIG. 19 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted by a plurality of imaging devices, or may be an imaging device having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to, for example, the imaging section 12031 among the above-described configurations. Then, by applying the technology according to the present disclosure to the imaging section 12031 and the like, it is possible to suppress the occurrence of shading in any input image at any shutter timing, and thus it is possible to obtain a high-quality captured image.

<Configuration that can be Used in Present Disclosure>

Note that the present technology can also have the following configurations.

<<A. Imaging Device>>

[A-01] An imaging device including a shutter function capable of performing a shutter operation at a desired timing within one horizontal synchronization period, in which in a pixel layout configuration in which pixels each including a photoelectric conversion unit are disposed in a matrix shape, a pixel control line is wired for each pixel row with respect to a matrix-like pixel array, and a vertical signal line and a power supply line of a high-potential-side power supply voltage are wired for each pixel column in a wiring layer different from a wiring layer in which the pixel control line is wired, the vertical signal line is shielded by a shielding power supply line of a low-potential-side power supply voltage.

[A-02] The imaging device according to [A-01], further including a function of generating an image with a high dynamic range by capturing a plurality of images at different exposure times and synthesizing a plurality of the images to generate one image.

[A-03] The imaging device according to [A-02], in which a plurality of the images at different exposure times includes a long-time exposure image having a relatively long exposure time and a short-time exposure image having a relatively short exposure time.

[A-04] The imaging device according to [A-03], in which an exposure time at a time of capturing the long-time exposure image and an exposure time at a time of capturing the short-time exposure image are capable of being individually adjusted by using the shutter function capable of performing a shutter operation at a desired timing within one horizontal synchronization period.

[A-05] The imaging device according to any one of [A-01] to [A-04], in which an existing power supply line of the low-potential-side power supply voltage is wired, in a state of being disposed in parallel with the pixel control line, in the wiring layer in which the pixel control line is wired, the shielding power supply line of the low-potential-side power supply voltage is wired, in a state of being disposed in parallel with the pixel control line, on an opposite side of the existing power supply line of the low-potential-side power supply voltage.

[A-06] The imaging device according to any one of [A-01] to [A-04], in which the shielding power supply line of the low-potential-side power supply voltage is wired, in a state of being disposed in parallel with the vertical signal line, in a wiring layer in which the vertical signal line is wired.

[A-07] The imaging device according to [A-06], in which the shielding power supply line of the low-potential-side power supply voltage is wired between the vertical signal line and the power supply line of the high-potential-side power supply voltage.

[A-08] The imaging device according to any one of [A-01] to [A-04], in which the vertical signal line is wired in a wiring layer different from the wiring layer in which the power supply line of the high-potential-side power supply voltage is wired, and the shielding power supply line of the low-potential-side power supply voltage is wired in the wiring layer in which the power supply line of the high-potential-side power supply voltage is wired.

[A-09] The imaging device according to any one of [A-01] to [A-08], in which a pixel includes a transfer transistor configured to transfer an electric charge photoelectrically converted by a photoelectric conversion unit to a charge-voltage conversion unit, and the pixel control line is a transfer control line for transferring a drive signal to the transfer transistor.

[A-10] The imaging device according to [A-09], in which the pixel includes a reset transistor configured to reset the charge-voltage conversion unit, and the pixel control line is a reset control line for transferring the drive signal to the reset transistor.

<<B. Electronic Apparatus>>

[B-01] An electronic apparatus including an imaging device including a shutter function capable of performing a shutter operation at a desired timing within one horizontal synchronization period, in which in a pixel layout configuration in which pixels each including a photoelectric conversion unit are disposed in a matrix shape, a pixel control line is wired for each pixel row with respect to a matrix-like pixel array, and a vertical signal line and a power supply line of a high-potential-side power supply voltage are wired for each pixel column in a wiring layer different from a wiring layer in which the pixel control line is wired, the vertical signal line is shielded by a shielding power supply line of a low-potential-side power supply voltage.

[B-02] The electronic apparatus according to [B-01], further including a function of generating an image with a high dynamic range by capturing a plurality of images at different exposure times and synthesizing a plurality of the images to generate one image.

[B-03] The electronic apparatus according to [B-02], in which a plurality of the images at different exposure times includes a long-time exposure image having a relatively long exposure time and a short-time exposure image having a relatively short exposure time.

[B-04] The electronic apparatus according to [B-03], in which an exposure time at a time of capturing the long-time exposure image and an exposure time at a time of capturing the short-time exposure image are capable of being individually adjusted by using the shutter function capable of performing a shutter operation at a desired timing within one horizontal synchronization period.

[B-05] The electronic apparatus according to any one of [B-01] to [B-04], in which an existing power supply line of the low-potential-side power supply voltage is wired, in a state of being disposed in parallel with the pixel control line, in the wiring layer in which the pixel control line is wired, the shielding power supply line of the low-potential-side power supply voltage is wired, in a state of being disposed in parallel with the pixel control line, on an opposite side of the existing power supply line of the low-potential-side power supply voltage.

[B-06] The electronic apparatus according to any one of [B-01] to [B-04], in which the shielding power supply line of the low-potential-side power supply voltage is wired, in a state of being disposed in parallel with the vertical signal line, in a wiring layer in which the vertical signal line is wired.

[B-07] The electronic apparatus according to [B-06], in which the shielding power supply line of the low-potential-side power supply voltage is wired between the vertical signal line and the power supply line of the high-potential-side power supply voltage.

[B-08] The electronic apparatus according to any one of [B-01] to [B-04], in which the vertical signal line is wired in a wiring layer different from the wiring layer in which the power supply line of the high-potential-side power supply voltage is wired, and the shielding power supply line of the low-potential-side power supply voltage is wired in the wiring layer in which the power supply line of the high-potential-side power supply voltage is wired.

[B-09] The electronic apparatus according to any one of [B-01] to [B-08], in which a pixel includes a transfer transistor configured to transfer an electric charge photoelectrically converted by a photoelectric conversion unit to a charge-voltage conversion unit, and the pixel control line is a transfer control line for transferring a drive signal to the transfer transistor.

[B-10] The electronic apparatus according to [B-09], in which the pixel includes a reset transistor configured to reset the charge-voltage conversion unit, and the pixel control line is a reset control line for transferring the drive signal to the reset transistor.

REFERENCE SIGNS LIST

1 CMOS image sensor
11 Pixel array unit
12 Row selection unit
13 Constant current source unit
14 Analog-digital conversion unit
15 Reference signal generation unit
16 Horizontal transfer scanning unit
17 Signal processing unit
18 Timing control unit
19 Horizontal transfer line
20 Pixel
21($21_{-1}$, $21_{-2}$) Photodiode (PD)
22($22_{-1}$, $22_{-2}$) Transfer transistor (TRG Tr.)
23 Reset transistor (RST Tr.)
24 Amplification transistor (AMP Tr.)
Selection transistor (SEL Tr.)
31($31_1$ to $31_m$) Pixel control line
32($32_1$ to $32_n$) Vertical signal line
33 Power supply line of low-potential-side power supply voltage $V_{SS}$
34 Power supply line of high-potential-side power supply voltage $V_{DD}$
35 to 39 Shielding power supply line of low-potential-side power supply voltage $V_{SS}$
41 First-layer semiconductor chip
42 Second-layer semiconductor chip
311 Transfer control line
312 Transfer control line
313 Reset control line
314 Selection control line

The invention claimed is:

1. An imaging device comprising:
pixels arranged in rows and columns, each of the pixels including a photoelectric conversion unit, the imaging device being configured for a shutter function that performs a shutter operation at a desired timing within one horizontal synchronization;
pixel control lines respectively disposed for each pixel row;
vertical signal lines and power supply lines of a high-potential-side power supply voltage respectively disposed for each pixel column, the vertical signal lines and the power supply lines being disposed in a different wiring layer from the pixel control lines, wherein
the vertical signal lines are respectively shielded by shielding power supply lines of a low-potential-side power supply voltage,
power supply lines of the low-potential-side power supply voltage are respectively disposed in parallel with the pixel control lines, in a same wiring layer as the pixel control lines, and
the shielding power supply lines of the low-potential-side power supply voltage are respectively disposed in parallel with the pixel control lines on opposite sides of the power supply lines of the low-potential-side power supply voltage.

2. The imaging device according to claim 1, wherein the imaging device is configured to generate an image with a high dynamic range by capturing a plurality of images at different exposure times and synthesizing the plurality of images to generate the image with the high dynamic range.

3. The imaging device according to claim 2, wherein the plurality of images at different exposure times includes a long-time exposure image having a relatively long exposure time and a short-time exposure image having a relatively short exposure time.

4. The imaging device according to claim 3, wherein an exposure time at a time of capturing the long-time exposure image and an exposure time at a time of capturing the short-time exposure image are capable of being individually adjusted by using the shutter function capable of performing a shutter operation at a desired timing within one horizontal synchronization period.

5. The imaging device according to claim 1, wherein the shielding power supply lines of the low-potential-side power supply voltage are disposed in parallel with the vertical signal lines in a same wiring layer as the vertical signal lines.

6. The imaging device according to claim 5, wherein the shielding power supply lines of the low-potential-side power supply voltage are respectively disposed between corresponding ones of the vertical signal lines and the power supply lines of the high-potential-side power supply voltage.

7. The imaging device according to claim 1, wherein the vertical signal lines are wired in a different wiring layer from the power supply lines of the high-potential-side power supply voltage, and the shielding power supply lines of the low-potential-side power supply voltage are wired in a same wiring layer as the power supply lines of the high-potential-side power supply voltage.

8. The imaging device according to claim 1, wherein each of the pixels includes a transfer transistor configured to transfer an electric charge photoelectrically converted by a photoelectric conversion unit to a charge-voltage conversion unit, and a corresponding pixel control line is a transfer control line for transferring a drive signal to the transfer transistor.

9. The imaging device according to claim 8, wherein each of the pixels includes a reset transistor configured to reset the charge-voltage conversion unit, and the corresponding pixel control line is a reset control line for transferring the drive signal to the reset transistor.

10. An electronic apparatus comprising the imaging device according to claim 1.

11. The electronic apparatus according to claim 10, wherein the imaging device is configured to generate an image with a high dynamic range by capturing a plurality of images at different exposure times and synthesizing the plurality of images to generate the image with the high dynamic range.

12. The electronic apparatus according to claim 11, wherein the plurality of images at different exposure times includes a long-time exposure image having a relatively long exposure time and a short-time exposure image having a relatively short exposure time.

13. The electronic apparatus according to claim 12, wherein an exposure time at a time of capturing the long-time exposure image and an exposure time at a time of capturing the short-time exposure image are capable of being individually adjusted by using the shutter function capable of performing a shutter operation at a desired timing within one horizontal synchronization period.

14. The electronic apparatus according to claim 10, wherein the shielding power supply lines of the low-potential-side power supply voltage are disposed in parallel with the vertical signal lines in a same wiring layer as the vertical signal lines.

15. The electronic apparatus according to claim 14, wherein the shielding power supply lines of the low-potential-side power supply voltage are respectively disposed between corresponding ones of the vertical signal lines and the power supply lines of the high-potential-side power supply voltage.

16. The electronic apparatus according to claim 10, wherein the vertical signal lines are wired in a different wiring layer from the power supply lines of the high-potential-side power supply voltage, and the shielding power supply lines of the low-potential-side power supply voltage are wired in a same wiring layer as the power supply lines of the high-potential-side power supply voltage.

17. The electronic apparatus according to claim 10, wherein each of the pixels includes a transfer transistor configured to transfer an electric charge photoelectrically converted by a photoelectric conversion unit to a charge-voltage conversion unit, and a corresponding pixel control line is a transfer control line for transferring a drive signal to the transfer transistor.

18. The electronic apparatus according to claim 17, wherein each of the pixels includes a reset transistor configured to reset the charge-voltage conversion unit, and the corresponding pixel control line is a reset control line for transferring the drive signal to the reset transistor.

* * * * *